United States Patent
Valikhani et al.

(10) Patent No.: US 11,481,891 B1
(45) Date of Patent: Oct. 25, 2022

(54) SYSTEMS AND METHODS FOR QUANTIFYING CONCRETE SURFACE ROUGHNESS

(71) Applicants: Alireza Valikhani, Miami, FL (US); Azadeh Jaberi Jahromi, Miami, FL (US); Samira Pouyanfar, Miami, FL (US); Islam Mohamed Mantawy, Miami, FL (US); Atorod Azizinamini, Miami, FL (US)

(72) Inventors: Alireza Valikhani, Miami, FL (US); Azadeh Jaberi Jahromi, Miami, FL (US); Samira Pouyanfar, Miami, FL (US); Islam Mohamed Mantawy, Miami, FL (US); Atorod Azizinamini, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/842,429

(22) Filed: Jun. 16, 2022

Related U.S. Application Data

(62) Division of application No. 17/373,057, filed on Jul. 12, 2021.

(51) Int. Cl.
  *G06T 7/00* (2017.01)
  *G06V 10/75* (2022.01)
  *G06K 9/62* (2022.01)

(52) U.S. Cl.
  CPC .......... *G06T 7/0004* (2013.01); *G06K 9/6256* (2013.01); *G06K 9/6277* (2013.01);
  (Continued)

(58) Field of Classification Search
  CPC ......... G06T 7/0004; G06T 2207/20084; G06T 2207/30132; G06K 9/6256; G06K 9/6277; G06V 10/758
  (Continued)

(56) References Cited

U.S. PATENT DOCUMENTS

| 4,958,306 A | 9/1990 | Powell et al. |
| 9,587,938 B2 | 3/2017 | Troxler et al. |

(Continued)

FOREIGN PATENT DOCUMENTS

| CN | 113076959 A | * 7/2021 |
| CN | 113792666 A | * 12/2021 |

OTHER PUBLICATIONS

Alireza Valikhani et al., Machine learning and image processing approaches for estimating concrete surface roughness using basic cameras, Computer-Aided Civil and Infrastructure Engineering, Comput Aided Civ Inf. 2020;1-14, 14 pages.

*Primary Examiner* — Sheela C Chawan
(74) *Attorney, Agent, or Firm* — Saliwanchik, Lloyd & Eisenschenk

(57) ABSTRACT

The degree of concrete surface roughness contributes to the bond strength between two concrete surfaces for either new construction or repair and retrofitting of concrete structures. Provided are novel systems and methods with industrial application to quantify concrete surface roughness from images which may be obtained from basic cameras or smartphones. A digital image processing system and method with a new index for concrete surface roughness based on the aggregate area-to-total surface area is provided. A machine learning method applying a combination of advanced techniques, including data augmentation and transfer learning, is utilized to categorize images based on the classification given during the learning process. Both (Continued)

methods compared favorably to a well-established method of 3D laser scanning.

20 Claims, 26 Drawing Sheets

(52) U.S. Cl.
CPC .. *G06V 10/758* (2022.01); *G06T 2207/20084* (2013.01); *G06T 2207/30132* (2013.01)

(58) Field of Classification Search
USPC ....... 382/100, 108, 155, 156, 181, 224, 274, 382/275, 305, 254, 225
See application file for complete search history.

(56) References Cited

U.S. PATENT DOCUMENTS

| | | | |
|---|---|---|---|
| 11,144,814 B2 * | 10/2021 | Cha | G06N 3/08 |
| 2002/0150294 A1 * | 10/2002 | Cave | G06V 20/695 |
| | | | 382/173 |
| 2005/0021285 A1 | 1/2005 | Troxler et al. | |
| 2006/0181262 A1 | 8/2006 | Glenn et al. | |
| 2009/0116697 A1 | 5/2009 | Shalaby et al. | |
| 2013/0155061 A1 | 6/2013 | Jahanshahi et al. | |
| 2013/0293880 A1 | 11/2013 | Honda et al. | |
| 2017/0336528 A1 | 11/2017 | Badri et al. | |
| 2019/0197356 A1 | 6/2019 | Kurita et al. | |

* cited by examiner

SYSTEMS AND METHODS FOR QUANTIFYING CONCRETE SURFACE ROUGHNESS

CROSS-REFERENCE TO RELATED APPLICATION

The present application is a divisional application of U.S. application Ser. No. 17/373,057, filed Jul. 12, 2021, the disclosure of which is hereby incorporated by reference in its entirety, including all figures, tables, and drawings.

GOVERNMENT SUPPORT

This invention was made with government support under 69A3551747121 awarded by US Department of Transportation. The government has certain rights in the invention.

BACKGROUND

The degree of concrete surface roughness contributes to the bond strength between two concrete surfaces which are cast at different ages for either new construction or repair and retrofitting of concrete structures. Many methods are presented in the literature to estimate the degree of concrete surface roughness either qualitatively or quantitatively; however, most of these methods present drawbacks including being a contact method, being expensive, needing excessive human processing, and not being suitable for assessing old structures based on their inspection records.

BRIEF SUMMARY

Embodiments of the subject invention provide novel and advantageous systems and methods for quantification of concrete surface roughness from images that may be obtained from basic cameras or smartphones. A digital image processing method with a new index for concrete surface roughness based on the aggregate area-to-total surface area (AR) is introduced. A machine learning method applying a combination of advanced techniques, such as data augmentation and transfer learning, is utilized to categorize images based on the classification given during the learning process. These novel methods were related to a well-established method of 3D laser scanning from sandblasted small concrete surfaces. Additionally, new images from the web of a sandblasted large-scale T-beam have been used to examine and validate both methods.

In an embodiment, a system for determining a measurement of surface roughness of a concrete sample can comprise a processor and a (non-transitory) machine-readable medium in operable communication with the processor and having instructions stored thereon that, when executed by the processor, perform the following steps: receiving an image of the concrete sample; defining a positive integer n and a positive integer index i ranging from 1 to n; defining a set of n roughness classes (Ci); defining for each Ci an associated average roughness value ($Ci_{av}$); generating for each Ci, a probability ($P_i$) of matching the image with that respective Ci; and determining a weighted average roughness value ($R_a$) for the image from the sum of each $P_i$ multiplied by the respective $Ci_{av}$ to obtain the measurement of surface roughness of the concrete sample. The determining of the $R_a$ for the image can comprise using the following equation:

$$R_a = \sum_{i=1}^{n} ((P_i) \cdot (Ci_{av})).$$

The generating of the $P_i$ can comprise using a convolutional neural network. The convolutional neural network may be trained using a transfer learning technique. The convolutional neural network may be trained using a data augmentation technique. The data augmentation technique may be applied in an offline manner to increase the sample size of training data and can comprise one or more of random left and right rotation of images, change in brightness, blur with a uniform filter, horizontal and vertical flipping, or resizing of images. The convolutional neural network may be trained using both a transfer learning technique and a data augmentation technique. The convolutional neural network may be trained using labeled surface roughness values of training images measured by an independent roughness measurement method. The independent roughness measurement method can comprise a non-contact measurement. The non-contact measurement can comprise 3D laser scanning and/or digital image analysis.

Embodiments may provide systems and methods for obtaining a measurement of surface roughness of a concrete sample. The systems and methods can comprise: receiving, by a processor, a first training image set; augmenting, by the processor, the first training image set, to create an augmented training image set which can comprise training images; determining, by the processor, a surface roughness measurement for each training image; classifying, by the processor, each training image into a training classification group based on the surface roughness measurement determined for that respective training image; determining, by the processor, an average surface roughness measurement for each training classification group; training, by the processor, a convolutional neural network to classify new images into a roughness classification group, to produce a trained convolutional neural network (TCNN); receiving, by the processor, a new image of the concrete sample, the new image not being present in the augmented training image set; and determining, by the processor, using the TCNN, a value of average surface roughness ($R_a$) for the new image of the concrete sample, to obtain the measurement of surface roughness of the concrete sample.

The augmenting of the first training image set can comprise one or more of random left and right rotation of images, change in brightness, blur with a uniform filter, horizontal and vertical flipping, or resizing of images. The determining of a surface roughness measurement for each training image can comprise at least one of loading values from existing measurements or calculating one or more values from digital image processing of training images. The existing measurements can comprise non-contact measurements associated with respective training images. The digital image processing of training images can comprise calculation of a ratio of aggregate area-to-total surface area (AR). The training of the convolutional neural network can comprise transfer learning from a dataset larger than the augmented training image set and training on training images from the augmented training image set. The determining of $R_a$ for the new image of the concrete sample may be completed on a computing device (e.g., a mobile device, phone, tablet, or laptop computer) at the same physical location as the concrete sample. The new image of the concrete sample may be obtained from a camera in operable communication with the computing device at the same physical location as the concrete sample.

A camera in operable communication with the mobile device may include an integrated camera of a mobile phone, tablet, or laptop; or a separate camera connected by wired or wireless connection (e.g., Bluetooth, near field communication, USB, serial cable, or other connection methods known in the art) or by transfer of media (e.g., removing an SD card from a phone and placing the card in a reader on or attached to the mobile device.)

The same physical location as the concrete sample may include a job site, construction site, roadway, repair location, building site, or investigation site. The same physical location as the concrete sample may include locations where an action is to be taken or a decision made with respect to the concrete sample (e.g., determining a need for further surface preparation, enhancing roughness degree, adding a mechanical connector, or applying a bonding agent) within a period of time (e.g., within minutes, in the same hour, day, or trip) from preparing the concrete sample or obtaining the image of the concrete sample. The same physical location as the concrete sample may include locations within a specified distance, e.g., within 1 kilometer, alternatively within 0.1, 0.25, 0.5, 2, 5, or 10 kilometers, including increments, combinations, and ranges of any of the foregoing.

Embodiments provide systems and methods for determining a measurement of surface roughness of a concrete sample. The systems and methods can comprise a processor and a (non-transitory) machine-readable medium in operable communication with the processor and having instructions stored thereon that, when executed by the processor, perform the following steps: receiving an image of the concrete sample; defining a positive integer n and a positive integer index i ranging from 1 to n; defining a set of n roughness classes (Ci), defining for each Ci an associated average roughness value ($Ci_{av}$); generating for each Ci, a probability ($P_i$) of matching the image with that respective Ci; and determining a weighted average roughness value ($R_a$) for the image from the sum of each $P_i$ multiplied by the respective $Ci_{av}$ to obtain the measurement of surface roughness of the concrete sample. The determining of the $R_a$ for the image can comprise using the following equation:

$$R_a = \sum_{i=1}^{n} ((P_i) \cdot (Ci_{av})).$$

The generating of the $P_i$ can comprise using a convolutional neural network. The convolutional neural network may be trained using a transfer learning technique. The convolutional neural network may be trained using a data augmentation technique. The data augmentation technique may be applied in an offline manner to increase the sample size of training data and can comprise one or more of random left and right rotation of images, change in brightness, blur with a uniform filter, horizontal and vertical flipping, or resizing of images. The convolutional neural network may be trained using labeled surface roughness values of training images measured by an independent non-contact roughness measurement method which can comprise either 3D laser scanning and/or digital image analysis.

BRIEF DESCRIPTION OF DRAWINGS

FIG. 15 shows a confusion matrix for deep learning model with transfer learning and data augmentation ("aug." model).

FIG. 16 shows a confusion matrix for deep learning model with transfer learning and without augmentation ("non-aug." model).

DETAILED DESCRIPTION

Figure 1A:
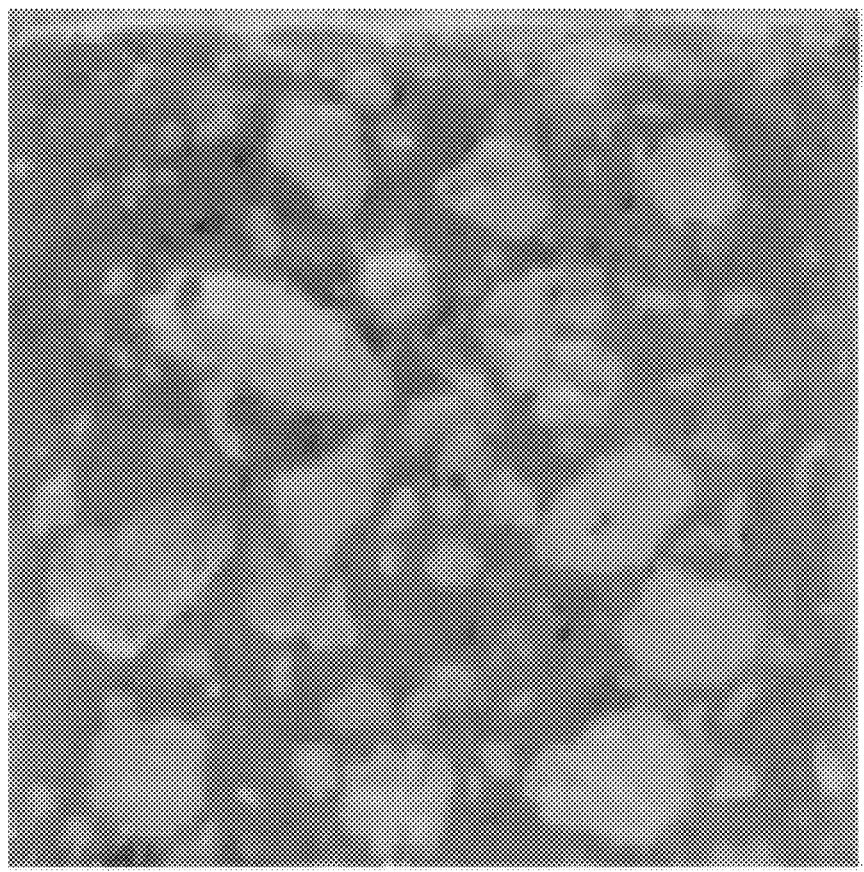
FIG. 1A is an image of a concrete surface roughened by sandblasting.

Embodiments of the subject invention provide novel and robust non-contact methods to evaluate concrete surface roughness from images (e.g., smart phone photos) using a machine learning approach. In this approach deep learning (e.g., deep neural networks) has been utilized to extract deep and meaningful features directly from raw images without any manual feature extraction or human intervention.

Embodiments provide a machine learning method, which may be defined as a classification technique that predicts the class of each image based on its deep visual features. Classification is a supervised machine learning method that requires data with pre-assigned labels. The model can learn from the existing data samples to predict the labels of future images. Available images may be divided into training sets and testing sets. A training set includes the data that are used for training the machine learning model while a testing set includes the data for validating the model. In some embodiments, approximately 80% of images may be used for training and 20% of images may be utilized for testing. The success of machine learning and deep learning techniques in the area of image and visual data processing heavily depends on the availability of large scale annotated datasets to learn the existing patterns in the data. However, collecting large scale image datasets with labels may be time consuming, tedious, and expensive especially in applications where sample size may be small and access to samples may be limited (e.g., in civil engineering an infrastructure applications generally, or in examination, quantification, analysis or repair of concrete structures specifically.) Embodiments of the subject invention may advantageously apply a powerful technique called data augmentation to generate synthetic training images from the existing data. This method helps the deep learning model to be generalized to new conditions and environments (e.g., those that are never experienced beforehand.) If the model only trains on the current image dataset, it may be difficult or almost impossible to predict the class of new images created under different conditions (e.g., images which are taken in a different lighting condition, or with a different angle.) However, using data augmentation, it is possible to generate a variety of samples by changing different characteristics of the images. Embodiments provide one or more augmentation operations including random rotation, blur, brightness, horizontal flipping, vertical flipping, and resizing the images. These operations are applied only on the training data to increase the sample size.

Casting concrete at different ages for new construction and for repairing or retrofitting concrete structures requires a sufficient bond between concrete casts. The bond strength between different casts is attributed to surface roughness. Surface roughness can be achieved in many ways, such as water jetting or sandblasting. In order to evaluate the degree of surface roughness, qualitative and quantitative methods are introduced by many researchers; however, several drawbacks are associated with these methods, including cost, availability, human errors, and inability to assess old structures from prior inspection records. Embodiments of the subject invention provide novel industrial implementation methods to quantitatively estimate the concrete surface roughness from images with sufficient resolution. In a first application method, a digital image processing method is proposed to distinguish the coarse aggregate from cement paste, and a new index is presented as a function of aggregate area proportional to the total surface area. In a second application method, data augmentation and transfer learning techniques in computer vision and machine learning are utilized to classify new images based on predefined images during the learning process. Both application methods are compared to a well-established method of 3D laser scanning from sandblasted concrete surfaces. A brand new set of images of sandblasted surfaces have been used to test and validate these novel methods. The results show that both tested methods successfully estimate the concrete surface roughness with an accuracy of more than 93%.

Exposing concrete structures to severe environmental conditions causes damage and reduction in the service life of structural members, such as bridge columns, bridge decks, bridge superstructures, and buildings (ASCE, (2017), *Infrastructure report card*. Reston, Va.: ASCE; which is hereby incorporated herein by reference in its entirety). Repairing and retrofitting these structural elements by applying repair materials, such as normal strength concrete, polymer concrete, and ultra-high performance concrete (Valikhani, et al., 2018, *Experimental investigation of high-performing protective shell used for retrofitting bridge elements* (No. 18-05142), Florida International University; which is hereby incorporated herein by reference in its entirety), to concrete substrates can be an economical option compared to the replacement of the entire structure. The bond strength between old concrete substrates and new repair materials plays a vital role in the selection of appropriate repair materials. In order to enhance bond strength characteristics between concrete substrate and repair material, roughening substrate surfaces with different techniques, such as sandblasting and water jetting may be preferable compared to grinding or wire brushing or chipping techniques. Additional advantages of both sandblasting and water jetting are attributed to the removal of large areas of the damaged substrate in a short time, preparing a sufficient roughness for the surface, avoiding micro-cracks, and introducing the highest bond strength. A drawback of these techniques is related to the variation of surface finish based on tools, technician experience, age of materials, and time of processing. After the removal of the damaged concrete, the substrate roughness is usually assessed based on qualitative methods and observation, which cannot be relied upon as an effective tool to quantitatively evaluate surface preparation due to factors including qualitative judgement, technician experience, and human errors.

The International Concrete Repair Institute (ICRI, (1997), *Selecting and specifying concrete surface preparation for sealers*, Coatings and Polymer Overlays, No. 03732, Des Plaines, Ill.: ICRI; which is hereby incorporated herein by reference in its entirety), proposed 10 different concrete surface profiles, which provide visual standards for fast and easy inspection and evaluation. Nevertheless, the results of this method are simply qualitative and subjected to technician judgment and can be altered from one technician to another due to human errors. In specifications, to address the interfacial bond strength, the substrate surface may be categorized based on surface finishing treatments, and coefficients of cohesion and friction may be calculated based on limited categories without direct correlation between surface roughness and surface parameters. The American Concrete Institute of 2008 (*Building code requirements for structural concrete* (ACI 318-08) *and commentary*, Farmington Hills, Mich.: ACI, ISBN: 978-0-87031-264-9; which is hereby incorporated herein by reference in its entirety) categorizes concrete surface roughness into four groups as concrete placed against clean concrete, surface with intentional roughness of amplitude of 6 mm (0.25 in.), concrete cast monolithically, and concrete placed next to structural steel section, whereas in AASHTO-LRFD (*Bridge design specifications*, American Association of State Highway and Transportation Officials, 5-138, 2017; which is hereby incorporated herein by reference in its entirety), two additional categories for lightweight concrete and cast-in-place concrete slab on clean concrete girder surfaces are discussed. In the fib model (Beton, D. (2013), *fib model code for concrete structures* 2010, Wiley-VCH Verlag Gmbh; which is hereby incorporated herein by reference in its entirety), four categories are defined from very smooth to very rough based on surface roughness. Although this categorization brings ease of use by designers, it does not effectively correlate the degree of surface roughness to surface parameters and bond strength. Therefore, quantitative methods to measure the concrete surface roughness are required to minimize human intervention.

Many quantitative methods have been developed in the literature, including numerous physical, digital, sensor based, optical, photographic, and microscopic methods. However, 3D laser scanning (see, e.g., Santos, et al., (2010), *Comparison of methods for texture assessment of concrete surfaces*, ACI Materials Journal, 107(5), 433-440; which is hereby incorporated herein by reference in its entirety) is identified as a suitable quantitative method as described below.

Embodiments provide novel noncontact methods for industrial application to evaluate surface roughness of concrete substrate using digital image processing and machine learning via basic cameras (e.g., smartphone cameras, tablet cameras, or consumer grade digital cameras.) For example, any device (e.g., a smartphone) capable of capturing images (e.g., images of at least 12 megapixels) can be used. The provided industrial application methods have been compared to a well-established method using 3D laser scanning. In a first novel method, digital image processing is utilized by introducing a new index (AR) using digital image processing to separate the aggregates from cement paste, and then taking a ratio of the aggregate area to total area which is calculated and correlated to surface roughness as obtained from 3D laser scanning. Since the provided image processing method is independent from other methods, the results may depend on classifying the new images to a certain class resulting in a robust qualitative method. To quantify the results, the index AR can be correlated to a degree of surface roughness such as obtained from laser scanner or any other methods.

In a second novel method, a practical application utilizing machine learning is provided. A deep neural network, also known as deep learning, has been utilized to extract deep and meaningful features directly from raw images as an automated method without any manual feature extraction and human efforts. The benefits of this method include: minimizing human intervention and minimizing errors related to environmental conditions, camera angle, and camera configuration. The use of these methods can offer other industrial alternatives to the 3D laser scanner, which is relatively high in cost and not widely available if compared to the use of basic cameras or smartphones. The bond strength between concrete substrate, prepared using sandblasting, and repair material can be calculated based on concrete surface roughness (see, e.g., Santos, et al., 2007, *Correlation between concrete-to concrete bond strength and the roughness of the substrate surface*, Construction and Building Materials, 21(8), 1688-1695; see also, e.g., Valikhani, et al., 2020, *Experimental evaluation of concrete-to-UHPC bond strength with correlation to surface roughness for repair application*, Construction and Building Materials, 238, https://doi.org/10.1016/j.conbuildmat.2019.117753; each of which is hereby incorporated by reference herein in its respective entirety).

Retrofitting and rehabilitation of concrete elements (e.g., by casting a new layer of ultra-high-performance concrete (UHPC)) may require a good bond between old and new layers to guarantee the success of this new method of retrofitting. It has been shown that the bond interface between two layers of concrete directly links to the surface roughness of the substrate (Valikhani, et al., *Experimental evaluation of concrete-to-UHPC bond strength with correlation to surface roughness for repair application*, Construction and Building Materials 238 (2020): 117753; which is hereby incorporated herein by reference in its entirety).

In order to roughen the substrate surface, sandblasting technology may be used. Embodiments of the subject invention provide methods to evaluate the roughness of concrete surfaces. Concrete surface roughness evaluation can be used in retrofitting and rehabilitation of damaged concrete elements or casting a new layer of concrete over a precast concrete.

Figure 13:
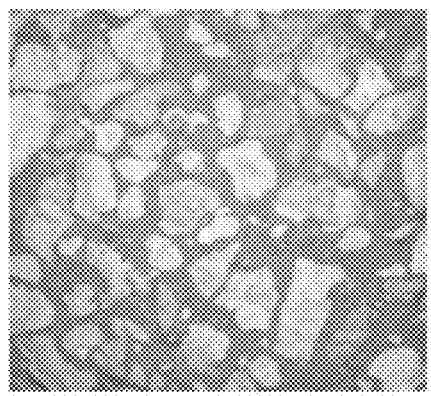
FIG. 13 shows a value of concrete surface roughness index AR for each of three different concrete surfaces measured according to an embodiment of the subject invention.
Figure 13:
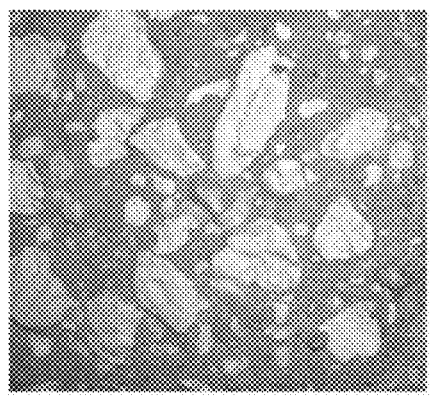
Figure 13:
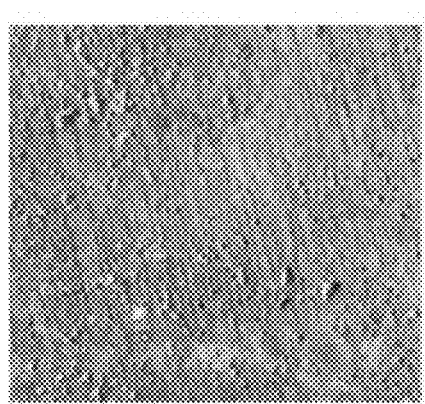

Embodiments provide novel non-contact methods to evaluate concrete surface roughness from images by leveraging digital image processing or machine learning techniques. Digital image processing may be used to develop a novel concrete roughness index (AR) which is calculated as the ratio between the total area of exposed coarse aggregates and total concrete surface by separating aggregates from cement paste. For example, AR of zero or close to zero represents a very smooth finish of the concrete surface, whereas AR of 1 represents only coarse aggregate. FIG. 13 shows three different surface roughness with corresponding AR. To maximize computational efficiency, the novel concrete roughness index (AR) may be used to label and create classes for images for training a convolution neural network (i.e., machine learning) by leveraging data augmentation and transfer learning techniques to utilize a relatively a small dataset (e.g., tens or hundreds of surface roughness images may be used to train the model, instead of thousands or tens of thousands.)

Embodiments provide novel application methods for estimating concrete surface roughness which have been related to and compared against a well-established method wherein 3D laser scanning is utilized to measure the concrete surface roughness for nine cubic specimens with a surface area of 153 mm×153 mm (6 in.×6 in.), which were roughened using sandblasting. In the first method, digital image processing is utilized to find the correlation between aggregate area and surface roughness. In the second method, an advanced machine learning technique is introduced to classify and calculate the surface roughness. Finally, to evaluate the efficiency of both methods, the surface roughness of a large scale T-beam specimen is assessed, and the results are compared to the 3D laser scanning method, independently.

Figure 1B:
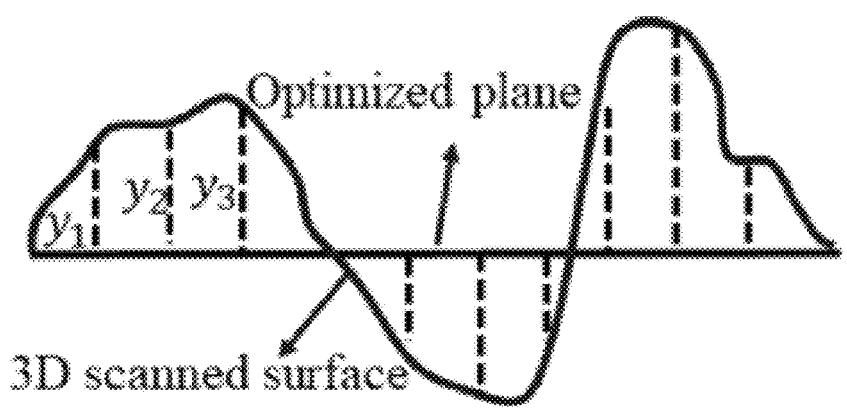
FIG. 1B is a two-dimensional representation of a scanned surface with peaks and valleys and a best fit plane produced from a 3D laser scanning method.

A 3D laser scanner method for estimating concrete surface roughness (Santos, et al., 2010) provides several advantages, such as ease of application, high measurement accuracy, noncontact method of measurement, and less sensitivity to the distance or angle of scanning; but comes with a high cost, complexity, and limited availability To measure concrete surface roughness using a 3D or 2D laser scanner, several steps should be conducted. In the first step, the concrete surface should be scanned to obtain a 2D image of the surface, as shown in FIG. 1A. In the second step, the scanned image of the concrete surface may be imported into a software (e.g., MATLAB) to generate a 3D coordinate surface based on the peaks and valleys of the surface. In the third step, an optimized smooth plane should be obtained to equalize the area of the peaks to the area of the valleys, as shown in FIG. 1B in 2D representation. In the final step, the degree of concrete surface roughness (Ra) should be calculated using Equation (1), which is modified from Santos, et al., (2010) by utilizing a discrete domain instead of a continuous domain by integrating the absolute peaks and valleys along the length of the two sides of the surface. One drawback of 3D laser scanning is that this method cannot distinguish whether the peaks and valleys are made of aggregate or cement.

$$R_a = \frac{\sum |y_i|}{n} \quad (1)$$

where Ra is average concrete surface roughness; $|y_i|$ is absolute distance of the peaks and valleys from the optimized plane, as shown in FIG. 1B, and n is number of data points associated with the scanned surface.

This method was used to measure the concrete surface roughness of nine small specimens and results were utilized to relate and calibrate both digital image processing and machine learning methods, respectively, against the 3D laser scanner results in Example 1, below.

According to an embodiment of the subject invention, several images were taken for each of the nine samples using a commercial camera of a smartphone with a quality of 12 megapixels. Based on these images, it was observed that the coarse aggregates were lighter in color compared to cement paste, and this variation in color can be used as an index to measure concrete surface roughness. In much rougher surfaces, the number of exposed coarse aggregates increases. The digital image processing method is sensitive to environmental conditions, such as lighting, dust, and darkness. Therefore, consistency in the condition of obtaining the images may be extremely important in some embodiments. To be consistent and to reduce the potential effect of these issues, the images were taken in a dark room with flash applied.

A binary decision was applied for pixel intensity of 0 for cement paste (black) and 1 for the aggregates (white) using Equation (2) to form a binary image (g(n)) per segment.

$$g(n) = \begin{cases} 1 \text{ if } k(n) < T \text{ for white pixel} \\ 0 \text{ if } k(n) < T \text{ for black pixel} \end{cases} \quad (2)$$

The number of white pixels, representing the aggregate (Equation 3) and the total number of white and black pixels, representing both aggregates and cement (Equation 4), were calculated for each image segment. The total aggregate area was then calculated for the whole image from each segment (Equation 5) by multiplying the number of white pixels times the area of each pixel. The total surface area was then calculated for the whole image from each segment (Equation 6) by multiplying the number of black pixels and white pixels times the area of each pixel. The ratio between the total aggregate area and surface area, AR, was used as an index of concrete surface roughness (Equation 7). The AR then can be related to the surface roughness calculated from the 3D laser scanning method with a function based on the sample results.

$$\text{number of white pixels for each segment} = \quad (3)$$

$$n(\text{segment}) = \sum_{1}^{W}\sum_{1}^{H}[K(1)]$$

Number of black and white pixels for each segment =  (4)

$$N(\text{segment}) = \sum_1^W \sum_1^H [K(0) + K(1)]$$

where H is a vertical coordinate in the segment (e.g., H=150 pixels in Example 1); W is a horizontal coordinate in the segment (e.g., W=150 pixels in Example 1); K(0) is a black pixel (digit 0) and K(1) is a white pixel (digit 1).

The total area of aggregate ($A_{aggregate}$) for each image is given by Equation (5).

$$A_{aggregate} = \sum_1^{segment} n(\text{segment}) \times A_{pixel}$$ (5)

The total area of surface ($A_{surface}$), including aggregate plus cement, for each image is given by Equation (6).

$$A_{surface} = \sum_1^{segment} N(\text{segment}) \times A_{pixel}$$ (6)

where, e.g., Apixel=(0.254 mm)²=(0.01 in)² and segment=16, in Example 1.

$$AR = A_{aggregate}/A_{surface}$$ (7)

Machine learning is a set of techniques that learn and experience from data without implementing an explicit program. Machine learning has been utilized in structural, civil, construction, bridge engineering, pavement, inspection, structural health monitoring (SHM), and earthquake engineering.

In other fields, deep learning and convolutional neural networks (CNN) have been used in various computer vision applications including thermal infrared face identification, vehicle classification in traffic sequences, image super resolution techniques, as well as an ensemble of CNNs to overcome the low resolution images of surveillance cameras for vehicle type recognition, and atrous convolutions and spatial pyramids for pupil detection and eye tracking.

Embodiments may provide a combination of advanced techniques in machine learning and computer vision including transfer learning and data augmentation which may be utilized to facilitate the use of small datasets in training for more practical industrial applications including evaluation of concrete surface roughness. The introduction of transfer learning and data augmentation may save the cost and effort of processing thousands or even millions of raw images with ground truth information (e.g., identification of corresponding degrees of surface roughness using 3D laser scanning). This increase in training efficiency may provide real technical and commercial benefits across many of the application areas mentioned above.

The great success of machine learning and deep learning techniques in the area of image and visual data processing heavily depends on the availability of large scale annotated datasets to learn the existing pattern in the data. However, collecting large scale image dataset with labels may be time consuming, tedious, and expensive, especially given issues of access and difficulty in obtaining quality images in many concrete repair applications (e.g., bridges, buildings, or highways are often remote, may be either elevated or covered by ground or water, and may be difficult to reach.) Embodiments of the subject invention provide a powerful technique called data augmentation (see, for example, Pouyanfar, et al., (2019), *Unconstrained flood event detection using adversarial data augmentation,* 2019 IEEE International Conference on Image Processing (ICIP) (p. 155); which is hereby incorporated herein by reference in its entirety) to generate synthetic training images from existing data. This method helps the deep learning model to be generalized to new conditions and environments. If the model only trains on the current image dataset, it may be difficult or almost impossible to predict the class of new images (e.g., images created under different conditions.)

Using data augmentation according to embodiments of the subject invention, it is possible to generate a variety of new samples by changing different characteristics of existing images. Embodiments provide augmentation operations including random rotation, blur, brightness, horizontal and vertical flipping, and resizing the images. Considering the fact that deep neural networks may require thousands or even millions of data samples with labels to learn the parameters of the network, it is still difficult to train a deep learning model on such a small dataset (e.g., less than a dozen images, dozens of images, or hundreds of images.) Thus, it may be advantageous to leverage existing pretrained models and transfer the knowledge from a large dataset (e.g., recognizing edges, shapes, and other common features) to this small dataset. This technique is called transfer learning. In other words, knowledge learned from a large scale dataset, such as ImageNet (ImageNet (2019), *image-net*, Retrieved from http://www.image-net.org; which is hereby incorporated by reference herein in its entirety), can be transferred to the proposed domain with a small number of images. The transfer learning technique has several advantages. First, it reduces the necessity of having large labeled training datasets, which is very time consuming and needs lots of human efforts. Second, it enhances the model performance due to the extra knowledge it captures from a source domain, which may not be available in the target problem. Moreover, it can significantly reduce the training time of the model development by utilizing the knowledge from a source domain instead of learning a model from scratch. (See, e.g., Yang, et al., (2019), *Multi-object tracking with discriminant correlation filter based deep learning tracker,* Integrated Computer-Aided Engineering, 26(3), 273-284; which is hereby incorporated by reference herein in its entirety; see also, e.g., Gao, et al., (2018), *Deep transfer learning for image based structural damage recognition,* Computer-Aided Civil and Infrastructure Engineering, 33(9), 748-768; which is hereby incorporated by reference herein in its entirety).

Turning now to the figures, FIG. 1A is an image of a concrete surface roughened by sandblasting, suitable for analysis by systems or methods according to embodiments of the subject invention. FIG. 1B is a two-dimensional representation of a scanned surface with peaks and valleys and a best fit plane produced from a 3D laser scanning method.

Figure 2A:
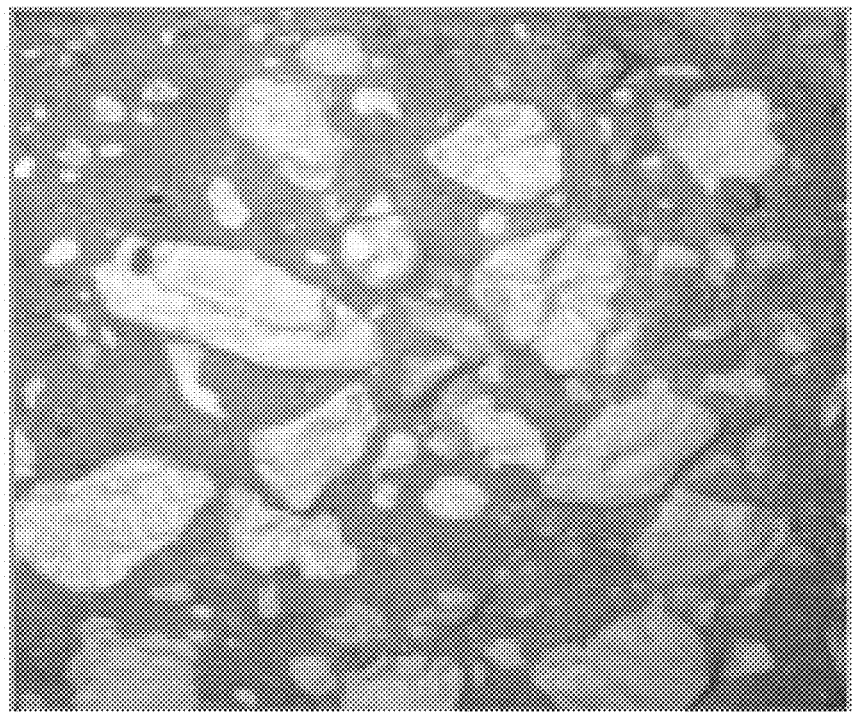
FIG. 2A is a full color RGB image of a concrete sample ready for image processing according to an embodiment of the subject invention.
Figure 2B:
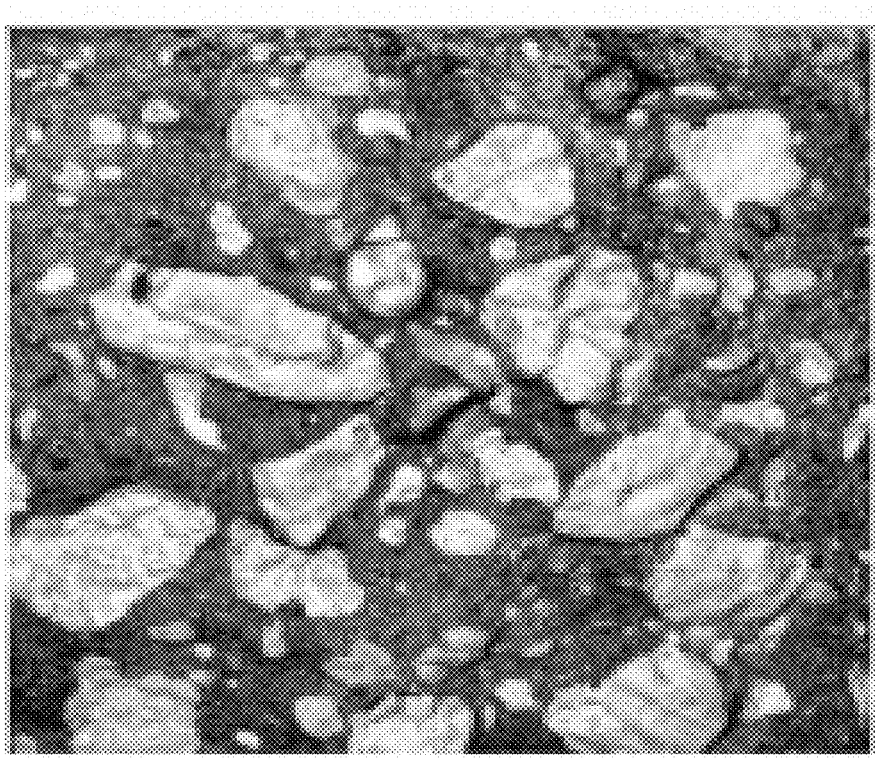
FIG. 2B is an RGB image after applying a contrast enhancement filter for image processing according to an embodiment of the subject invention.

FIGS. 2A through 2F illustrate a digital image processing sequence according to an embodiment of the subject invention. FIG. 2A is a full color RGB image of a concrete sample ready for image processing according to an embodiment of the subject invention. This image may be obtained with a commercially available imaging system (e.g., a consumer grade camera, smartphone, or tablet). FIG. 2B is an RGB image after applying a contrast enhancement filter for image processing according to an embodiment of the subject invention.

The digital image processing may be implemented in a commercially available analysis Software (e.g., MATLAB) or through custom software modules. The digital image processing may be implemented as a mobile application for use in the field (e.g., on a mobile device app directly at the site of image collection, or on a laptop computer or server at a jobsite trailer or mobile operations center) or at a remote location (e.g., on a laptop, desktop, or server at a remote data center, office, or cloud computing environment.)

Figure 2C:
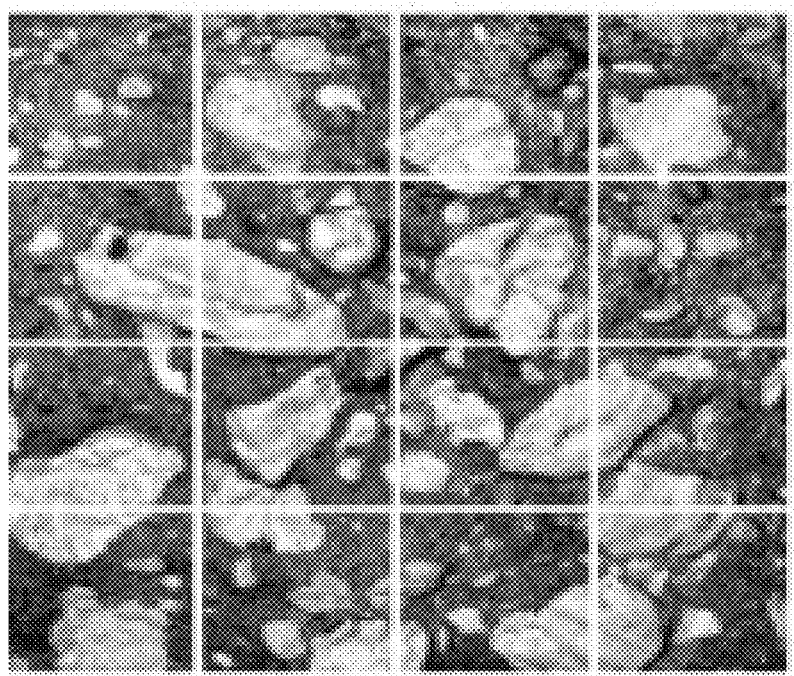
FIG. 2C is a segmentation of the RGB image after applying contrast enhancement filter for image processing according to an embodiment of the subject invention.

FIG. 2C is a segmentation of the RGB image after applying contrast enhancement filter for image processing according to an embodiment of the subject invention. Images may be segmented in a 4×4 grid as shown, producing 16 segments for analysis; alternatively in a 2×2, 3×3, 5×5, 6×6, 7×7, 8×8, 9×9, or larger grid, including increments, combinations, and ranges of any of the foregoing. Segmentation may be symmetric (e.g., N×N, where N is an integer) or asymmetric (e.g., N×M where N and M are integers and N M.) Segmentation size may be determined by fixed values (e.g., based on image size; available computing resources such as memory, storage, or processing power; or expected or known sample parameters such as aggregate size, aggregate distribution, estimated or expected roughness, or reference measurements taken before, concurrent with, or after image collection.) Segmentation may be evenly distributed (e.g., all segments the same size), unevenly distributed (e.g., some segments larger or smaller than others), or adaptively distributed (e.g., segment size chosen by an algorithm, formula, iteration, analysis, or human intervention) based on image properties (e.g., number, size, or distribution of aggregate; or initial digital image analysis results.)

Figure 2D:
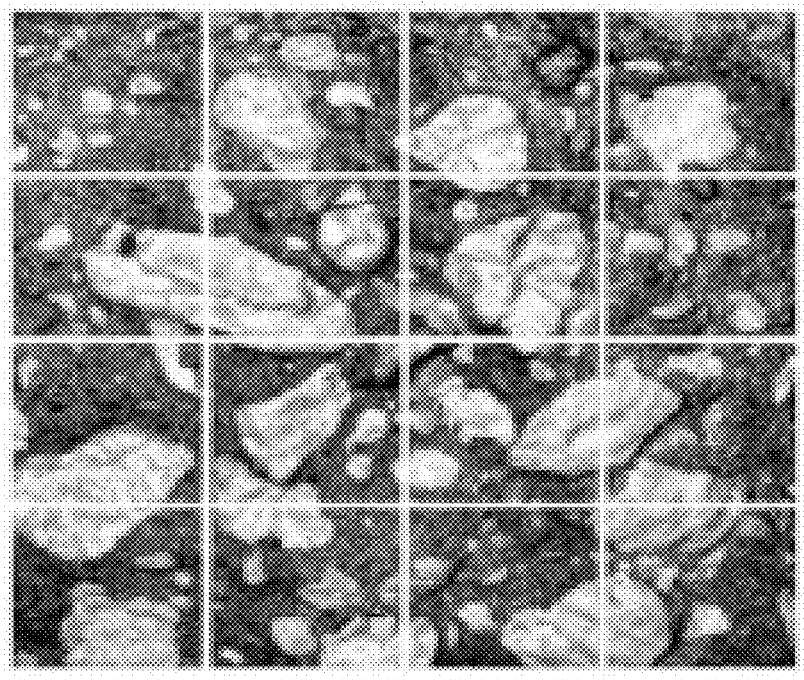
FIG. 2D is a segmented gray-scale image for image processing according to an embodiment of the subject invention.
Figure 2E:
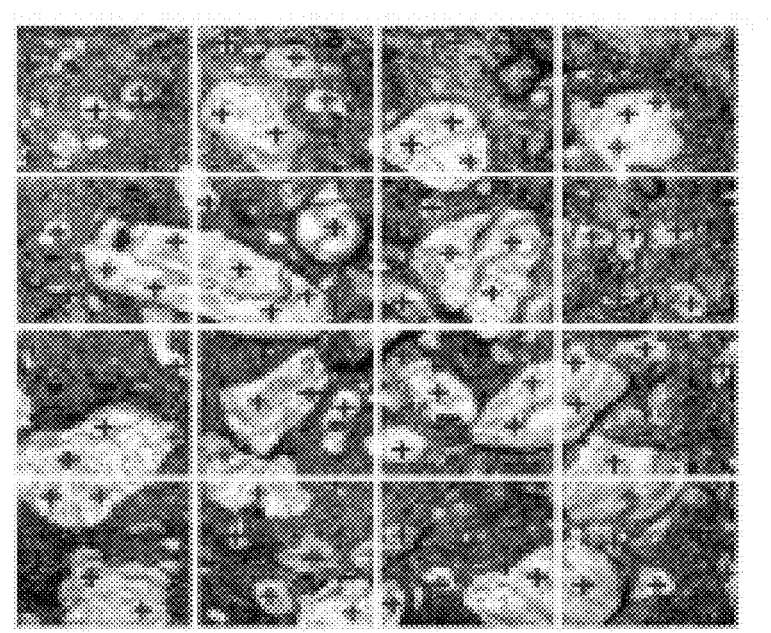
FIG. 2E is a segmented image in the process of threshold selection for image processing according to an embodiment of the subject invention.
Figure 2F:
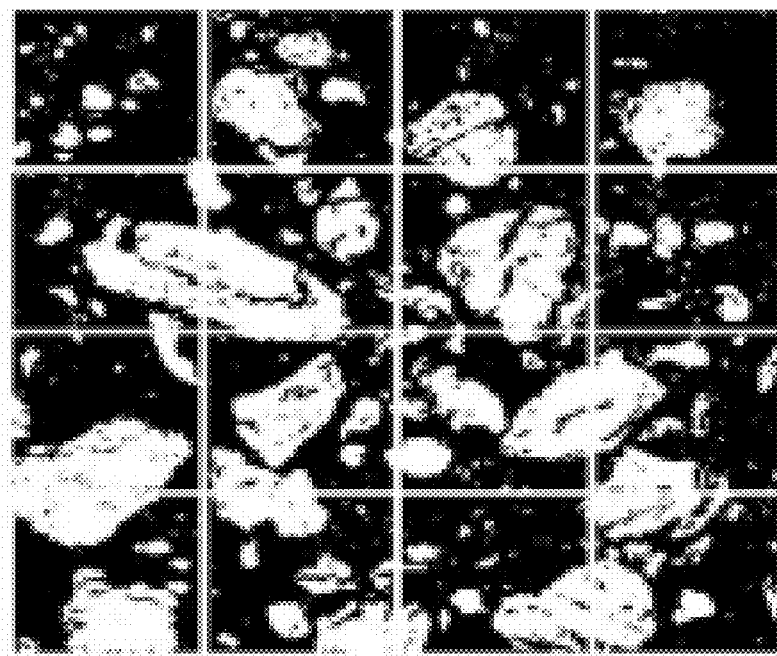
FIG. 2F is a black and white image showing separation of aggregate for image processing according to an embodiment of the subject invention.

FIG. 2D is a segmented gray-scale image for image processing according to an embodiment of the subject invention. FIG. 2E is a segmented image in the process of threshold selection for image processing according to an embodiment of the subject invention. The crosses in FIG. 2E represent the points that were manually selected to separate the aggregate from the cement. FIG. 2F is a black and white image showing separation of aggregate for image processing according to an embodiment of the subject invention. Gray-scale conversion, threshold selection, and black and white mapping may be performed with or without human intervention and with or without automated analysis, algorithms, or computer intervention (e.g., including digital image processing, deep learning, machine learning, or other approaches.)

Figure 3A:
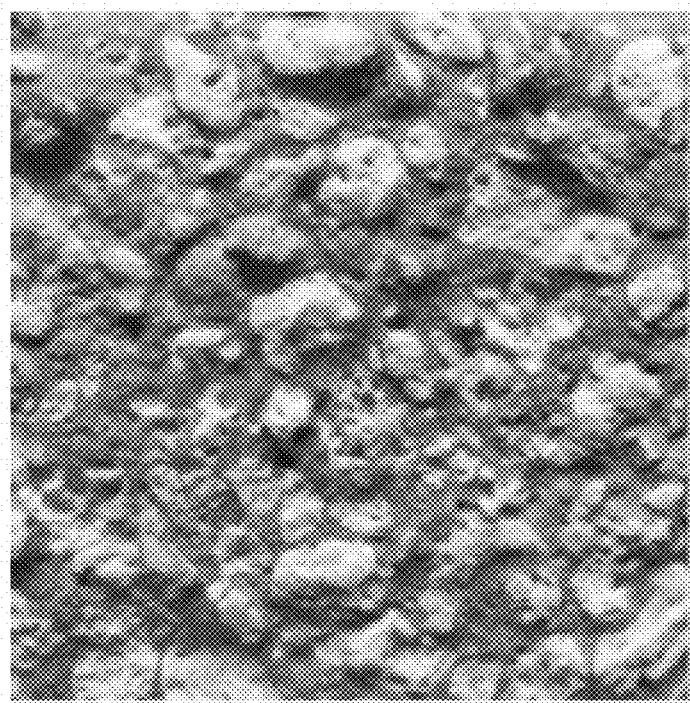
FIG. 3A is an image of concrete surface in office light used in accordance with embodiments of the subject invention.
Figure 3B:
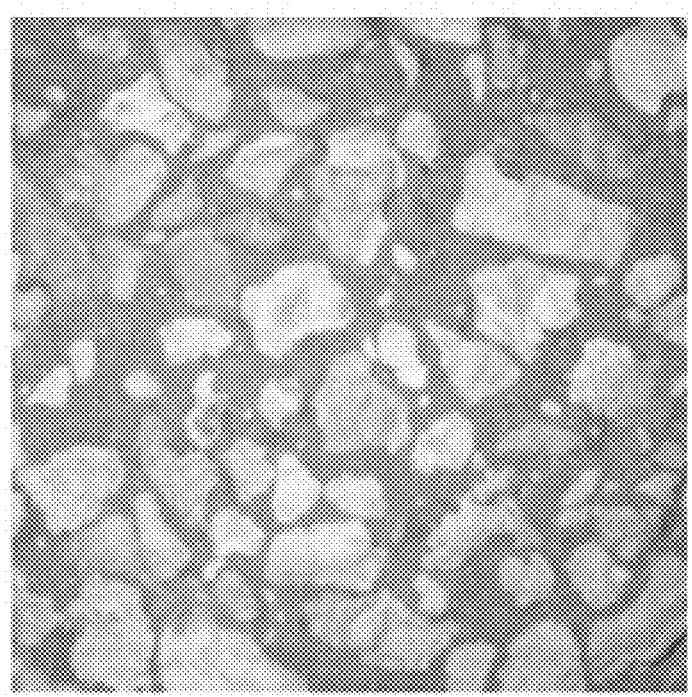
FIG. 3B is an image of concrete surface in a dark room with flash used in accordance with embodiments of the subject invention.
Figure 3C:
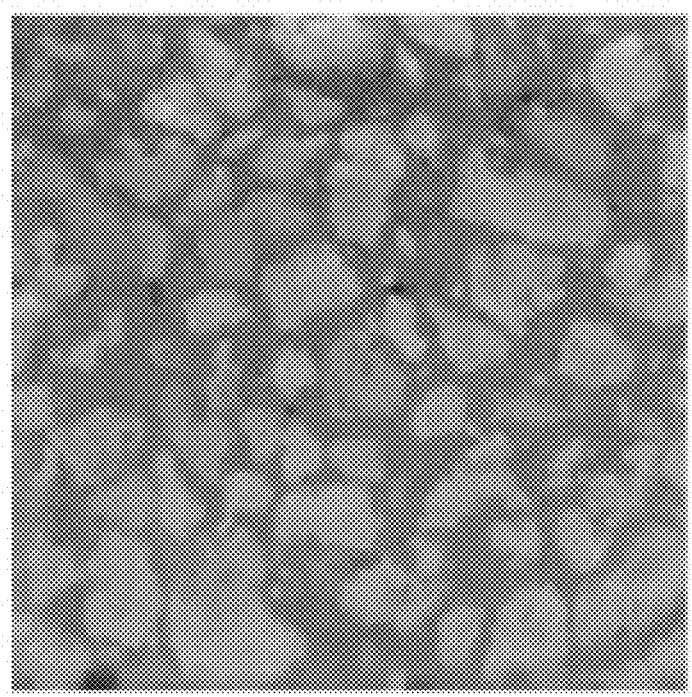
FIG. 3C is an image of concrete surface from a scanner used in accordance with embodiments of the subject invention.
Figure 3D:
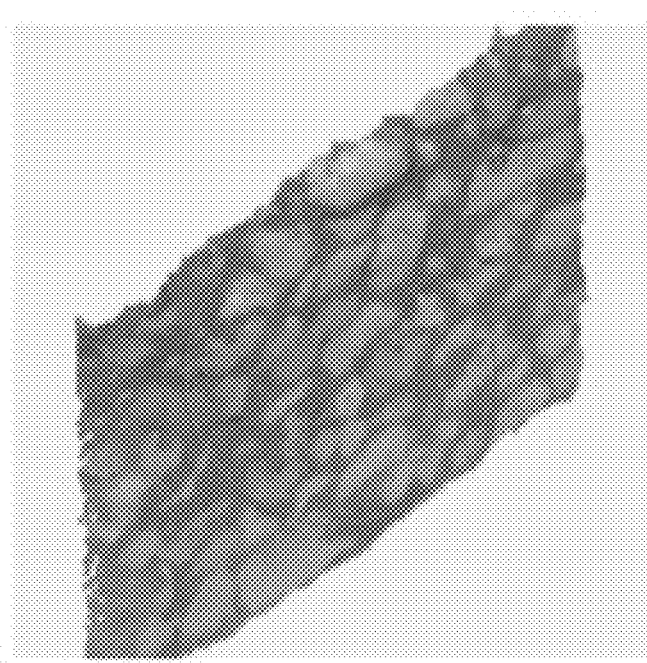
FIG. 3D is an image of concrete surface from an angle used in accordance with embodiments of the subject invention.

FIG. 3A is an image of concrete surface in office light used in accordance with embodiments of the subject invention. FIG. 3B is an image of concrete surface in a dark room with flash used in accordance with embodiments of the subject invention. FIG. 3C is an image of concrete surface from a scanner used in accordance with embodiments of the subject invention. FIG. 3D is a scanned image of concrete surface from an angle used in accordance with embodiments of the subject invention. Embodiments of the subject invention may provide processing to account for images taken from the above and other input conditions (e.g., including natural light, daylight, night lighting, ambient lighting, street lights, and flash applied with or without daylight, natural light, full sun, shade, night-time lighting, and with or without a screen, box, blind, hood, tarp, or other method of blocking, reducing, directing, or controlling existing or additional light sources.

Figure 4A:
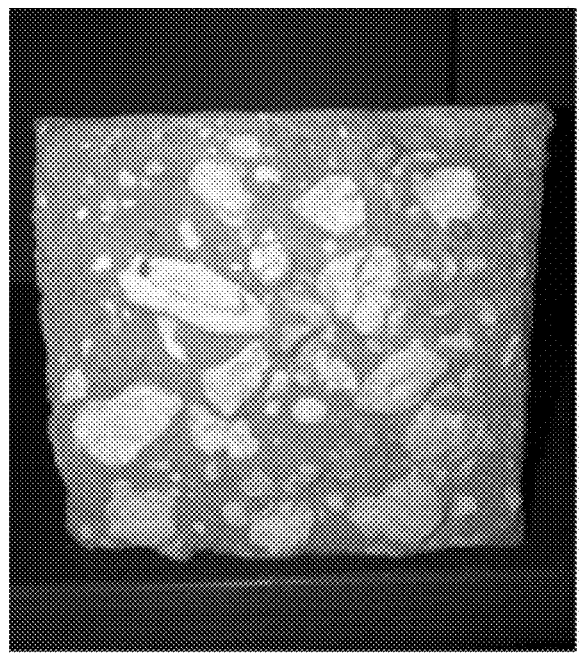
FIG. 4A is a sample of an original image of a concrete surface used in accordance with embodiments of the subject invention.
Figure 4B:
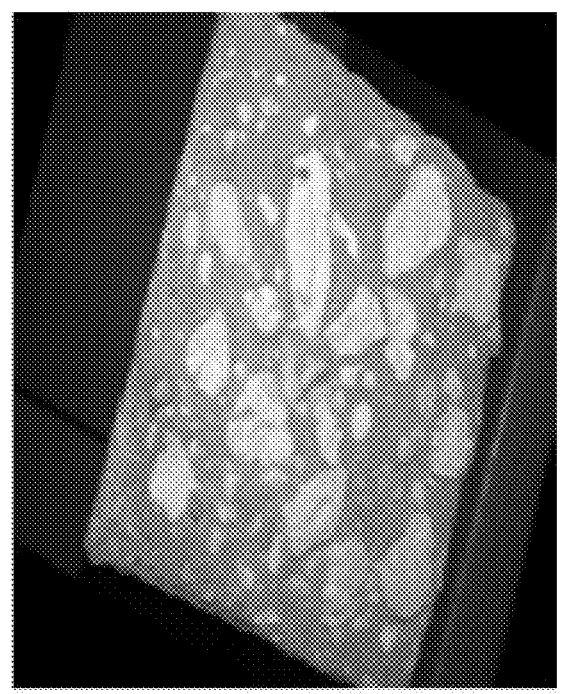
FIG. 4B is a sample of an augmented flipped original image of a concrete surface used in accordance with embodiments of the subject invention.
Figure 4C:
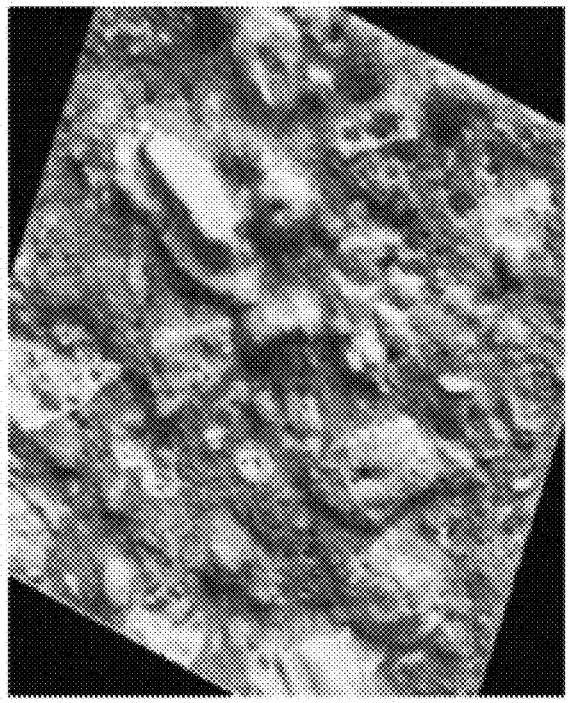
FIG. 4C is a sample of an augmented flipped image of a concrete surface used in accordance with embodiments of the subject invention.
Figure 4D:
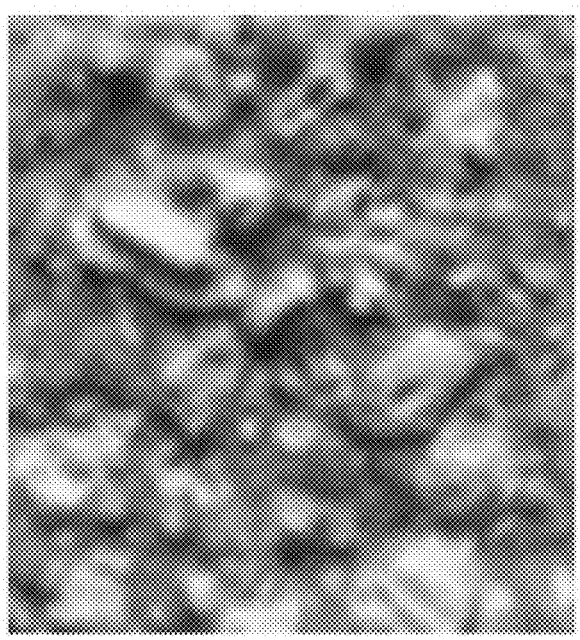
FIG. 4D is a sample of an augmented blurry image of a concrete surface used in accordance with embodiments of the subject invention.

FIG. 4A is a sample of an original image of a concrete surface used in accordance with embodiments of the subject invention. FIG. 4B is a sample of an augmented flipped original image of a concrete surface used in accordance with embodiments of the subject invention. FIG. 4C is a sample of an augmented flipped image of a concrete surface used in accordance with embodiments of the subject invention. FIG. 4D is a sample of an augmented blurry image of a concrete surface used in accordance with embodiments of the subject invention. Augmentation of images according to embodiments of the subject invention may include the above and other manipulations known in the art.

Figure 5:
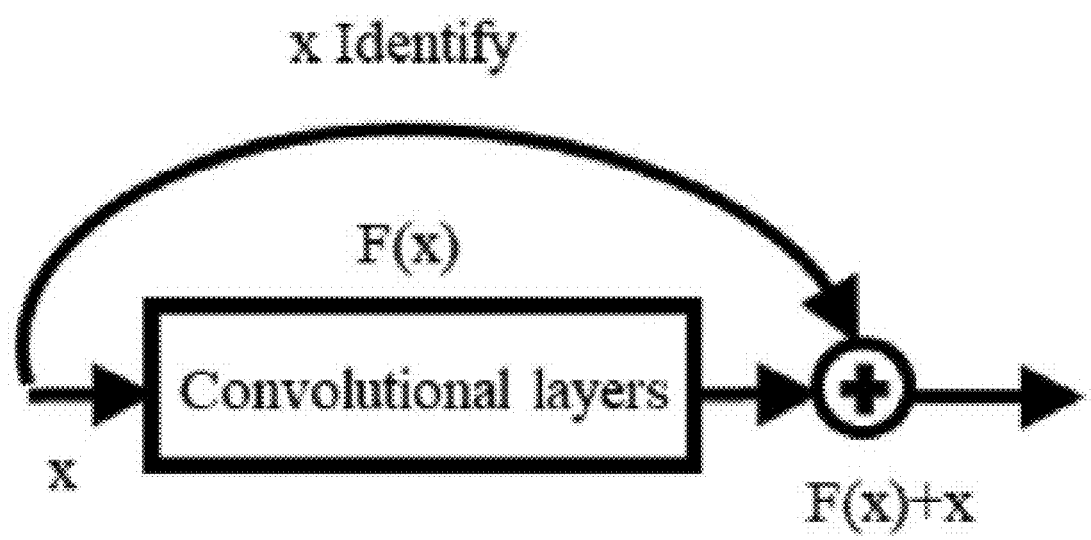
FIG. 5 is a block diagram of the ResNet model used in accordance with embodiments of the subject invention.
Figure 6A:
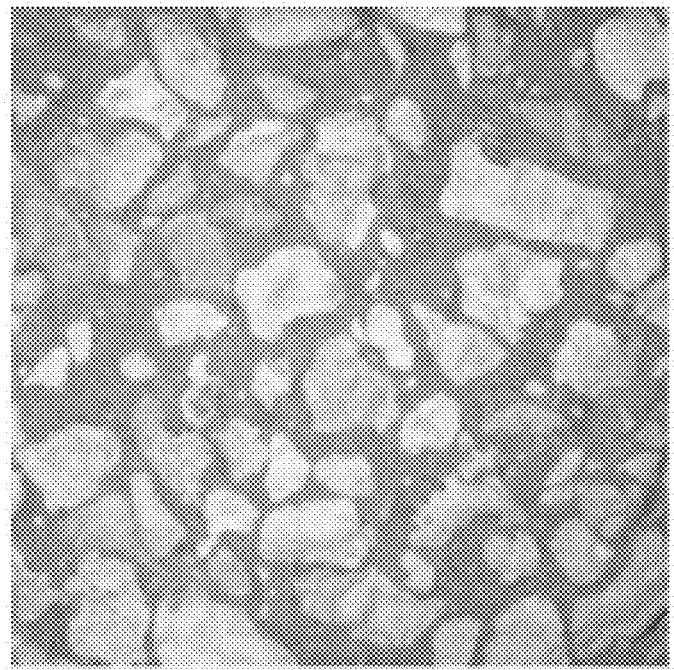
FIG. 6A shows sample image 1 of 9 used to test a digital image processing method and a machine learning method according to embodiments of the subject invention.
Figure 6B:
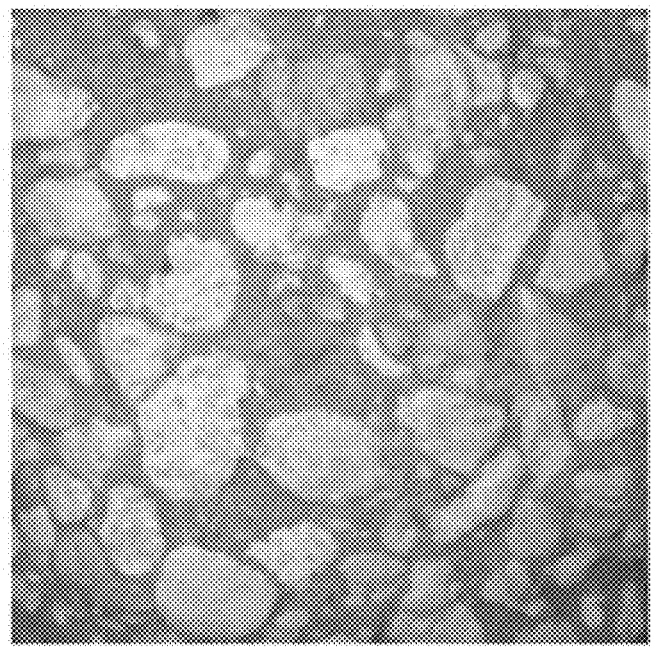
FIG. 6B shows sample image 2 of 9 used to test a digital image processing method and a machine learning method according to embodiments of the subject invention.
Figure 6C:
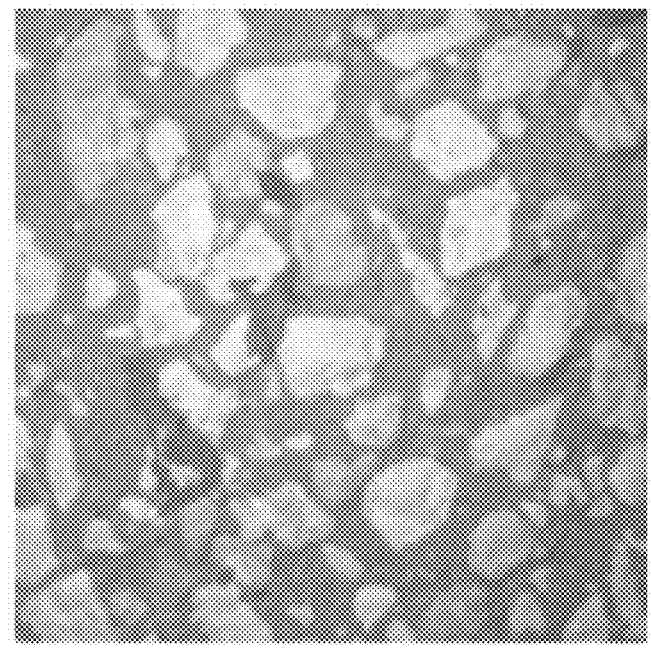
FIG. 6C shows sample image 3 of 9 used to test a digital image processing method and a machine learning method according to embodiments of the subject invention.
Figure 6D:
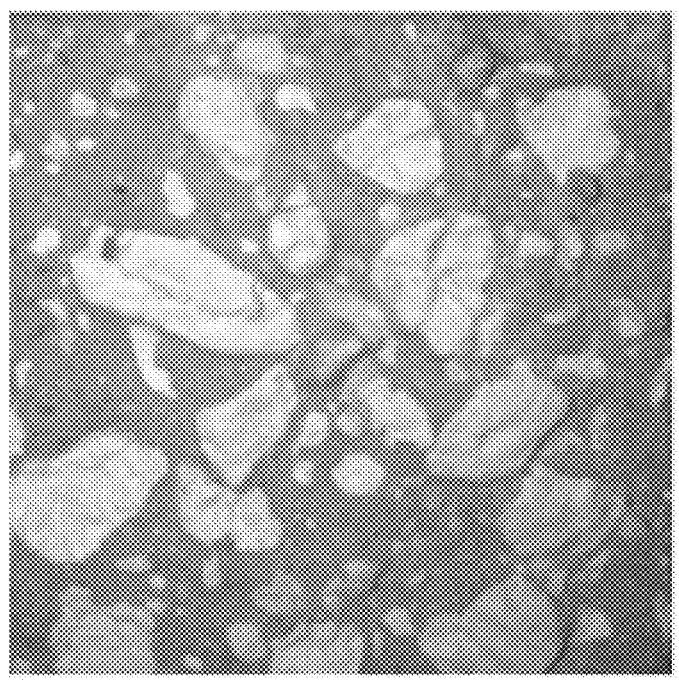
FIG. 6D shows sample image 4 of 9 used to test a digital image processing method and a machine learning method according to embodiments of the subject invention.
Figure 6E:
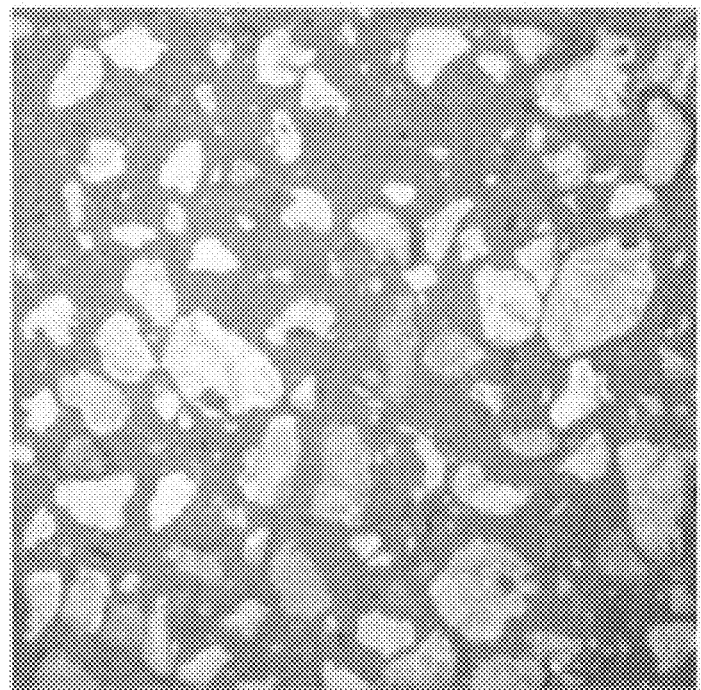
FIG. 6E shows sample image 5 of 9 used to test a digital image processing method and a machine learning method according to embodiments of the subject invention.
Figure 6F:
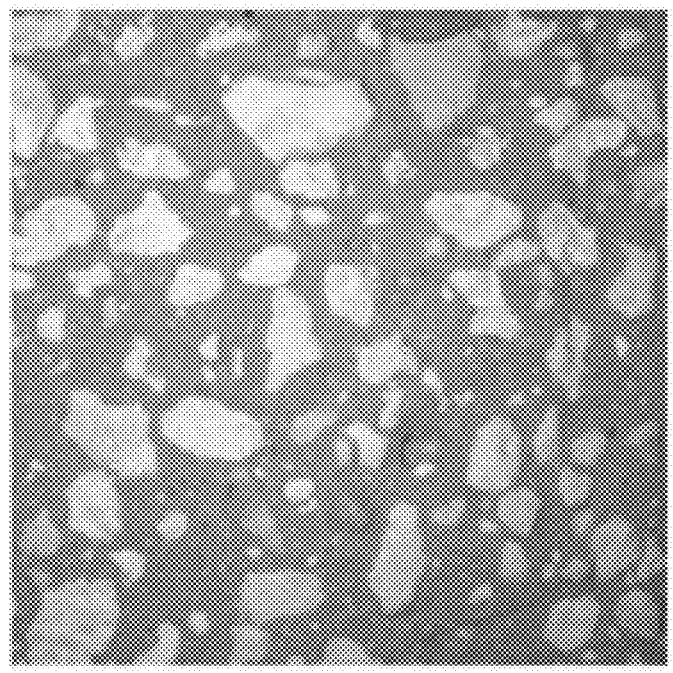
FIG. 6F shows sample image 6 of 9 used to test a digital image processing method and a machine learning method according to embodiments of the subject invention.
Figure 6G:
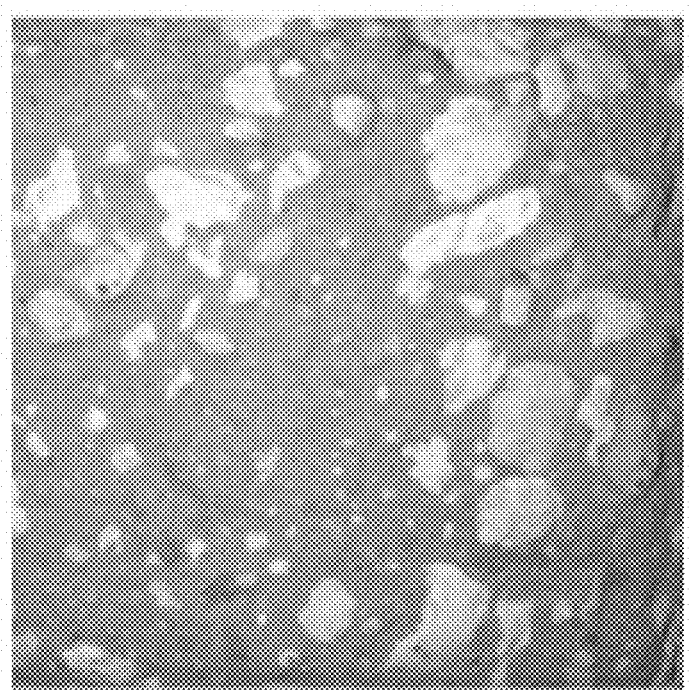
FIG. 6G shows sample image 7 of 9 used to test a digital image processing method and a machine learning method according to embodiments of the subject invention.
Figure 6H:
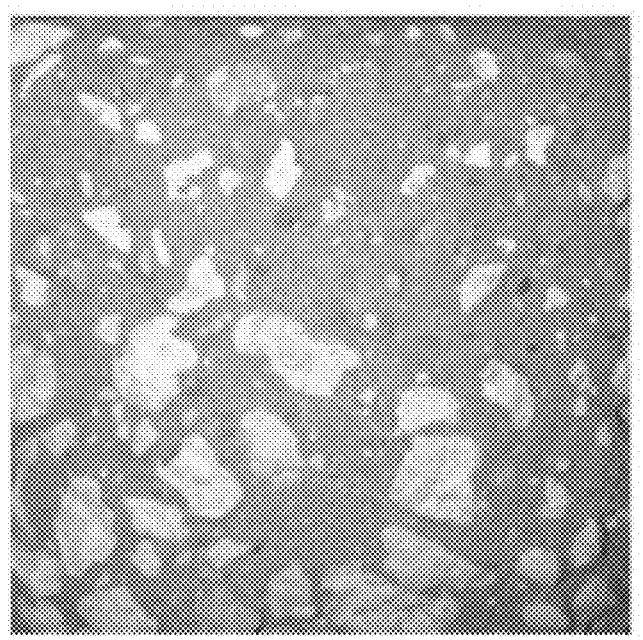
FIG. 6H shows sample image 8 of 9 used to test a digital image processing method and a machine learning method according to embodiments of the subject invention.
Figure 6I:
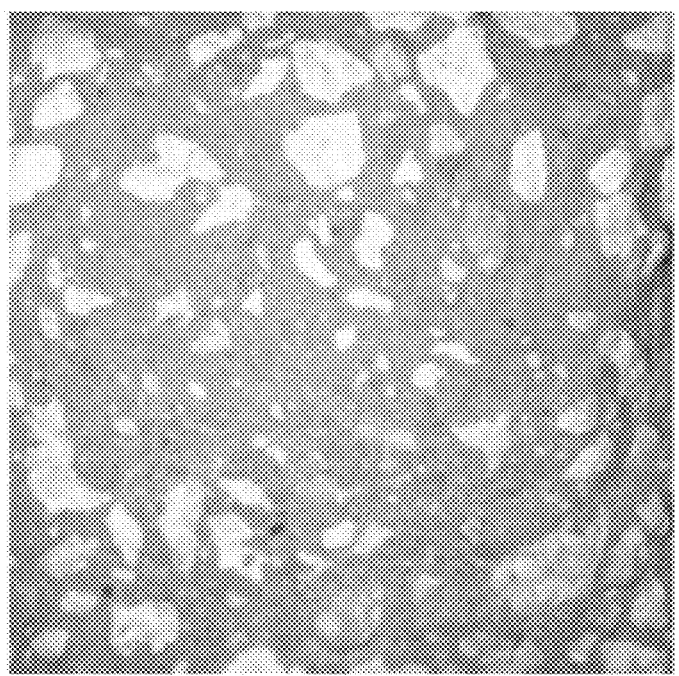
FIG. 6I shows sample image 9 of 9 used to test a digital image processing method and a machine learning method according to embodiments of the subject invention.

FIG. 5 is a block diagram of the ResNet model used in accordance with embodiments of the subject invention. In addition to the model shown in FIG. 5, various additional models, summing or other functions, and formulations for F(x) known in the art or later discovered, published, or developed, are contemplated for use with embodiments.

FIGS. 6A through 6I show sample images 1 through 9, respectively, as used to test a digital image processing method and a machine learning method according to embodiments of the subject invention, and as later classified in FIG. 14.

Figure 7:
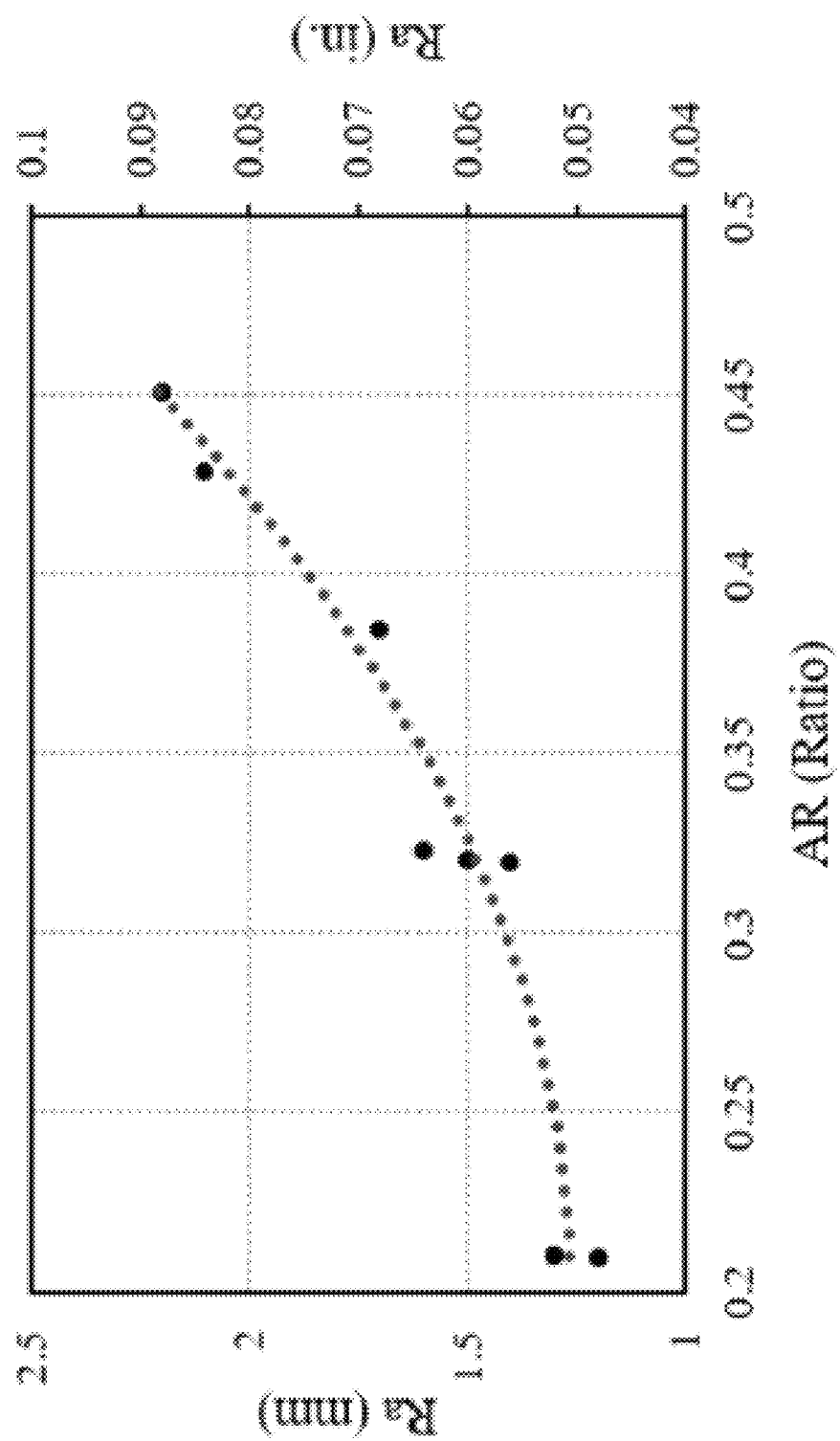
FIG. 7 is a chart showing a correlation between the ratio of the aggregate area-to-total area (AR) to concrete surface roughness ($R_a$).

FIG. 7 is a chart showing a correlation between the ratio of the aggregate area-to-total area (AR) to concrete surface roughness (Ra) according to an embodiment of the subject invention. The larger discrete points represent individual data points and the smaller dotted line represents Equation 9 as fit to this data.

Figure 8:
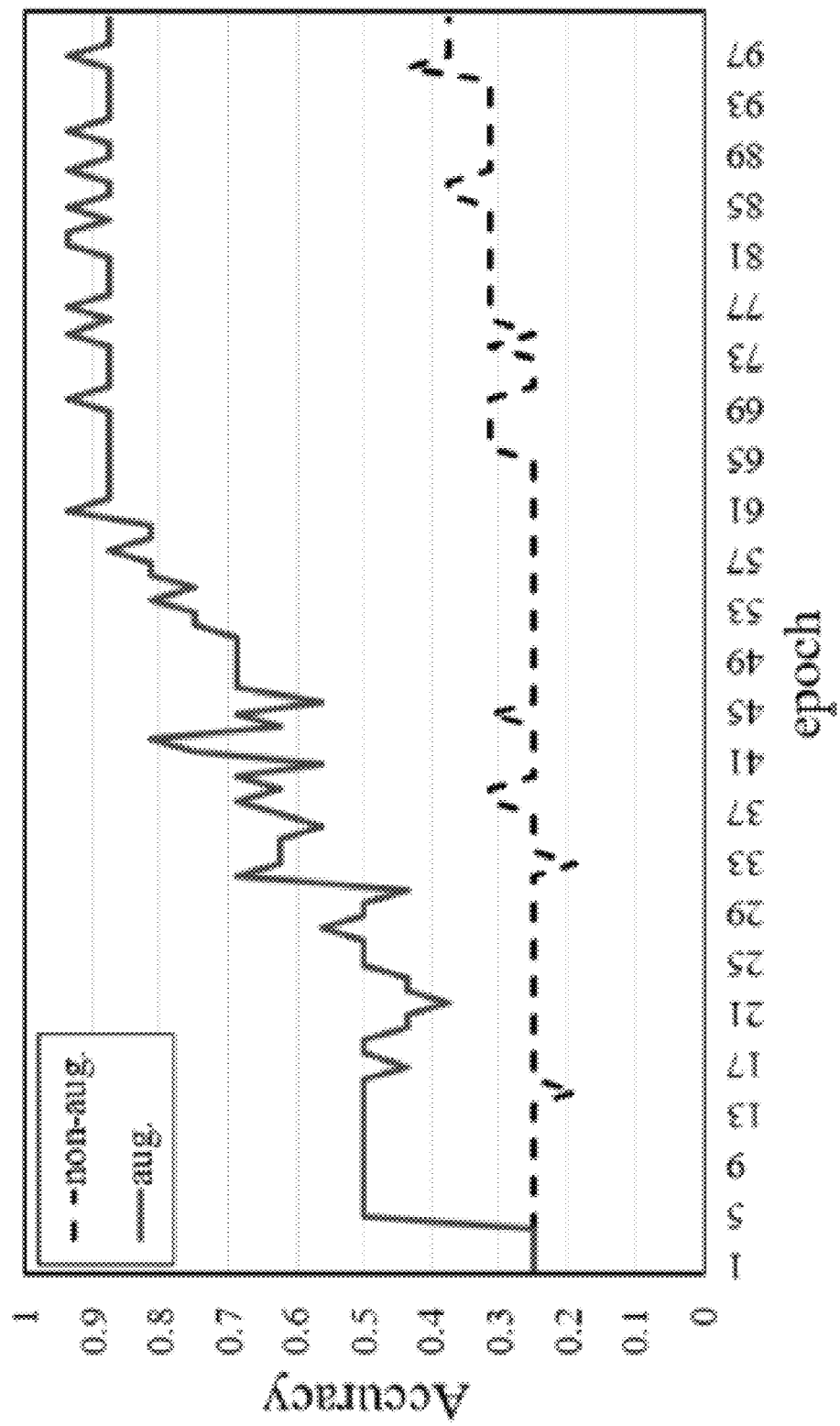
FIG. 8 is a chart showing the accuracy of augmented and non-augmented deep learning models at each epoch.

FIG. 8 is a chart showing the accuracy of augmented (solid line) and non-augmented (dashed line) deep learning models at each epoch according to an embodiment of the subject invention. The of augmented (solid line) model approaches an accuracy of about 0.9 after about 60 epochs. The non-augmented (dashed line) model approaches an accuracy of about 0.4 after about 93 epochs. FIG. 8 is related to the training process depicted in FIGS. 3A-3D and 4A-4D, and FIG. 9 is related to samples identified in FIGS. 6A-6I.

Figure 9:
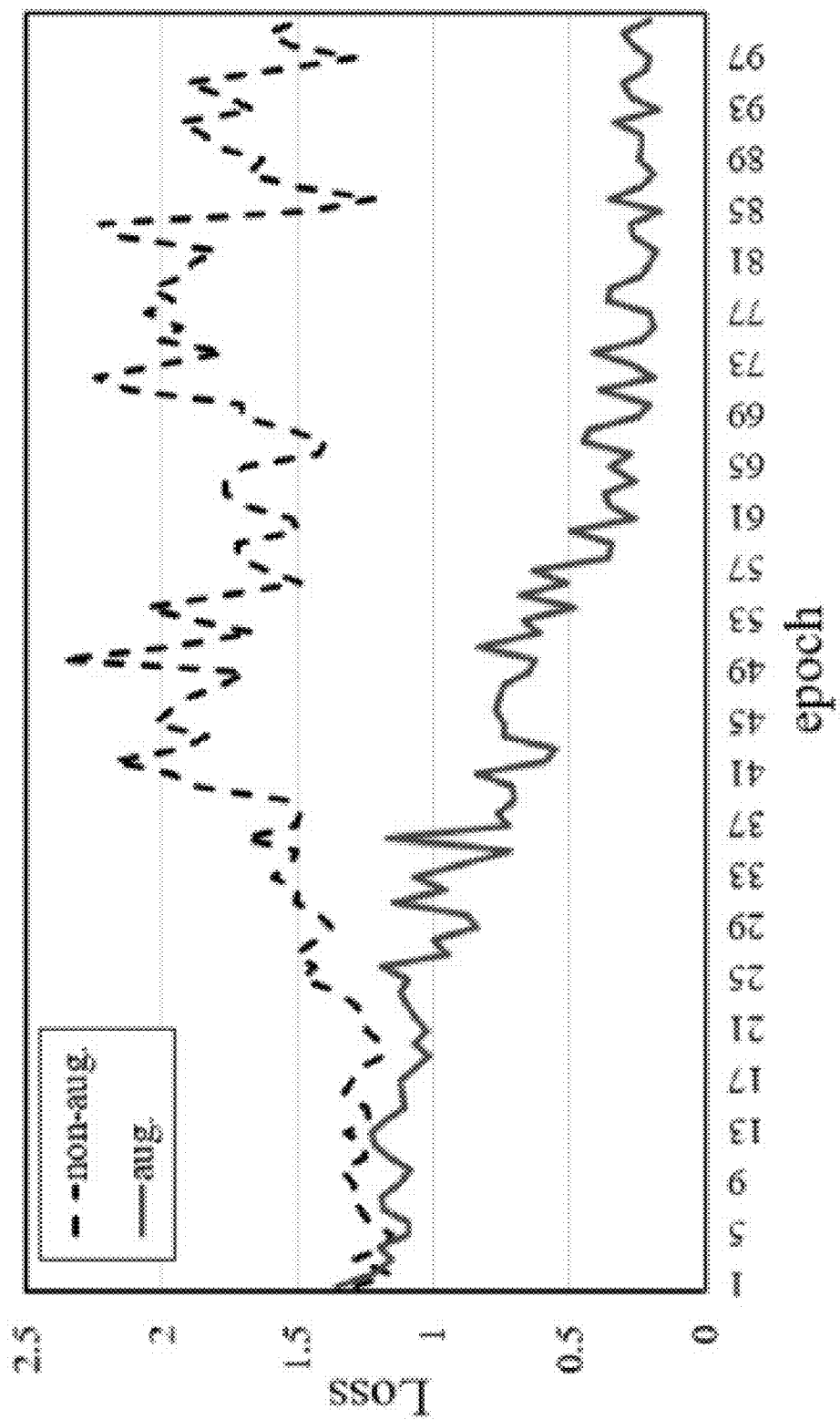
FIG. 9 is a chart showing the loss values of augmented and non-augmented deep learning models at each epoch.

FIG. 9 is a chart showing the loss values of augmented (solid line) and non-augmented (dashed line) deep learning models at each epoch according to an embodiment of the subject invention. The augmented (solid line) model approaches a loss of about 0.25 after about 80 epochs. The non-augmented (dashed line) model approaches a loss of between about 1.5 and about 2.0 after about 40 epochs.

Figure 10:
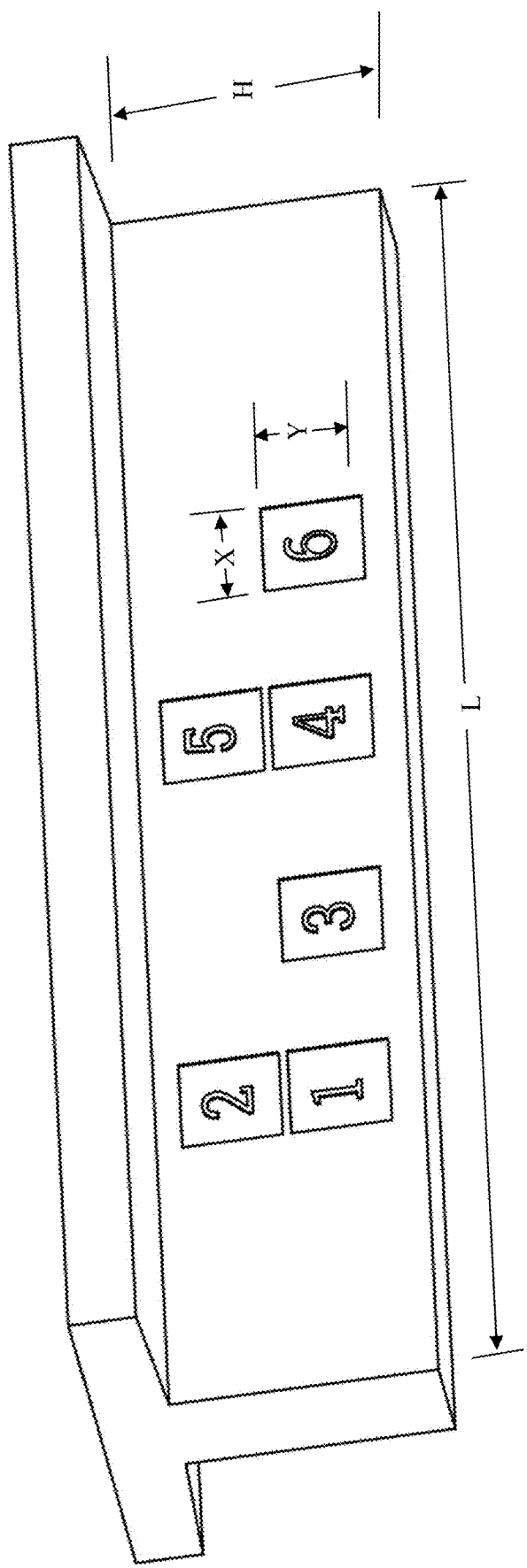
FIG. 10 is an illustration of a large scale (H=419 mm; L=4,724 mm; X=203.2 mm; Y=203.2 mm) T-beam with roughened surface with six samples marked for analysis.
Figure 11A:
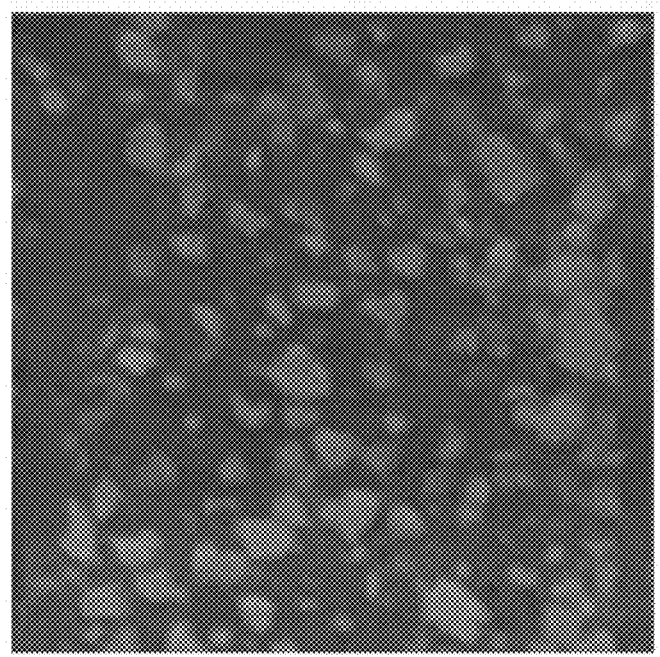
FIG. 11A shows large-scale sample image 1 of 6 extracted from the beam represented in FIG. 10 and used to test a digital image processing method and a machine learning method according to embodiments of the subject invention.
Figure 11B:
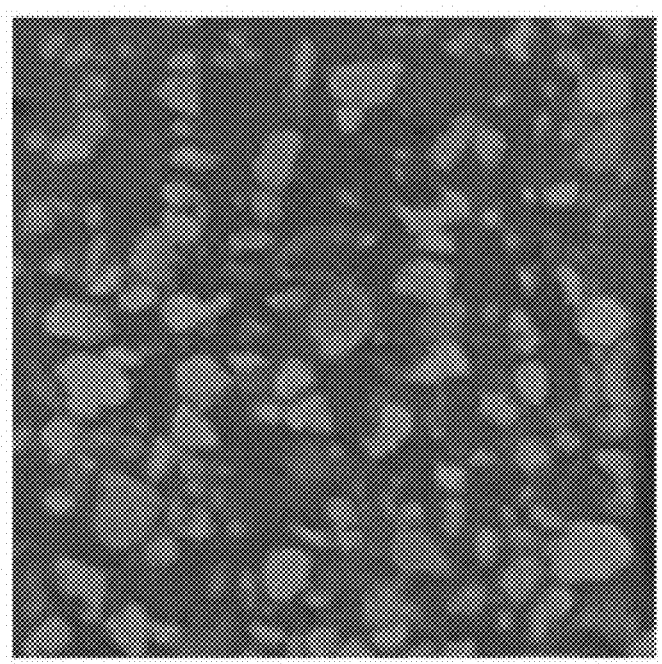
FIG. 11B shows large-scale sample image 2 of 6 extracted from the beam represented in FIG. 10 and used to test a digital image processing method and a machine learning method according to embodiments of the subject invention.
Figure 11C:
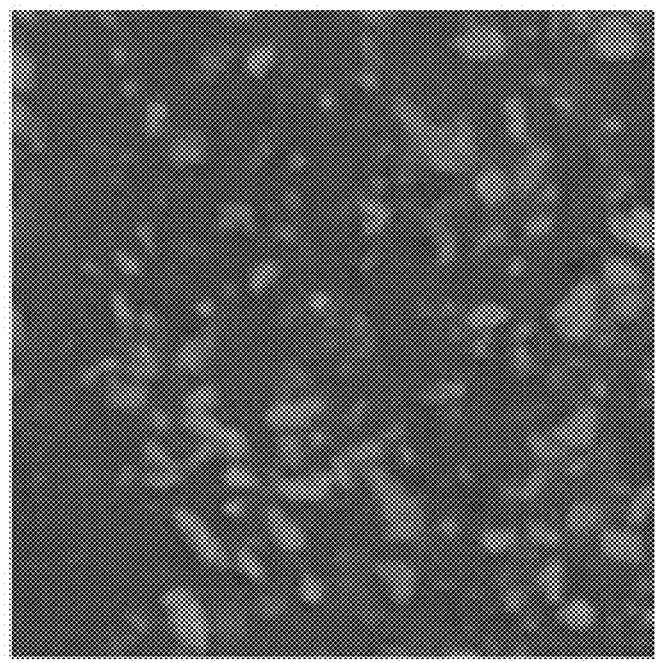
FIG. 11C shows large-scale sample image 3 of 6 extracted from the beam represented in FIG. 10 and used to test a digital image processing method and a machine learning method according to embodiments of the subject invention.
Figure 11D:
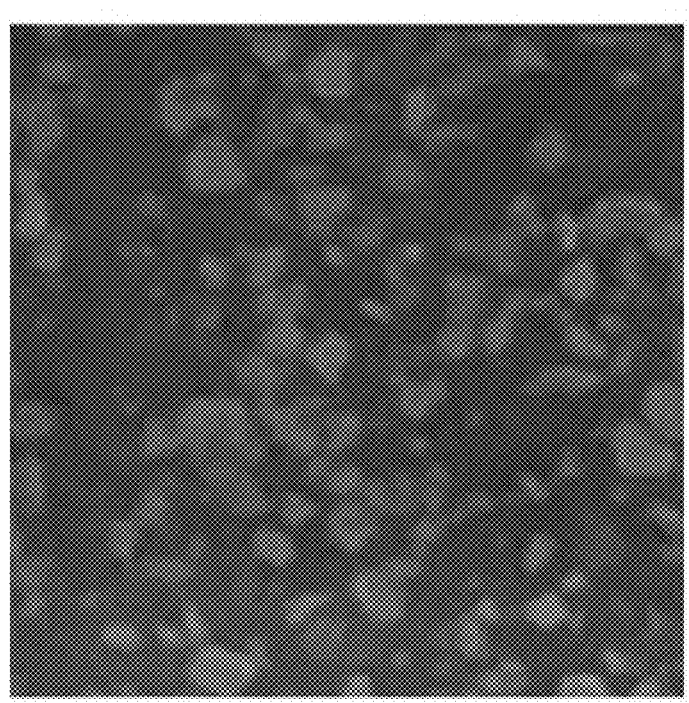
FIG. 11D shows large-scale sample image 4 of 6 extracted from the beam represented in FIG. 10 and used to test a digital image processing method and a machine learning method according to embodiments of the subject invention.
Figure 11E:
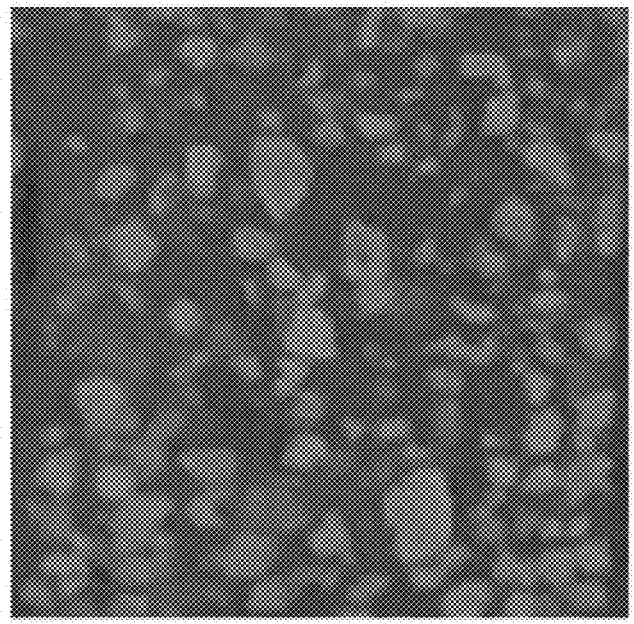
FIG. 11E shows large-scale sample image 5 of 6 extracted from the beam represented in FIG. 10 and used to test a digital image processing method and a machine learning method according to embodiments of the subject invention.
Figure 11F:
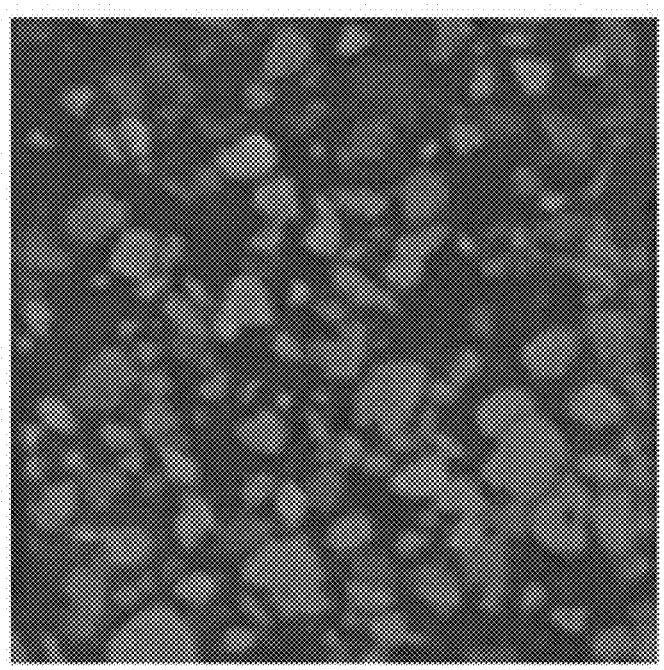
FIG. 11F shows large-scale sample image 6 of 6 extracted from the beam represented in FIG. 10 and used to test a digital image processing method and a machine learning method according to embodiments of the subject invention.

FIG. 10 is an illustration of a large scale (H=419 mm; L=4,724 mm; X=203.2 mm; Y=203.2 mm) T-beam with roughened surface with six samples marked for analysis according to an embodiment of the subject invention.

FIGS. 11A through 11F show large-scale sample images 1 through 6 extracted from the beam represented in FIG. 10 and used to test a digital image processing method and a machine learning method according to embodiments of the subject invention. Six images were used in the validation of both digital image processing and machine learning systems and methods. The images were taken from roughened areas on a web of a large T-beam with a total length of 4,724 mm (186 in.) and a height of 419 mm (16.5 in.). Each sample was 203.2 mm×203.2 mm (8 in.×8 in.) in size.

Figure 12:
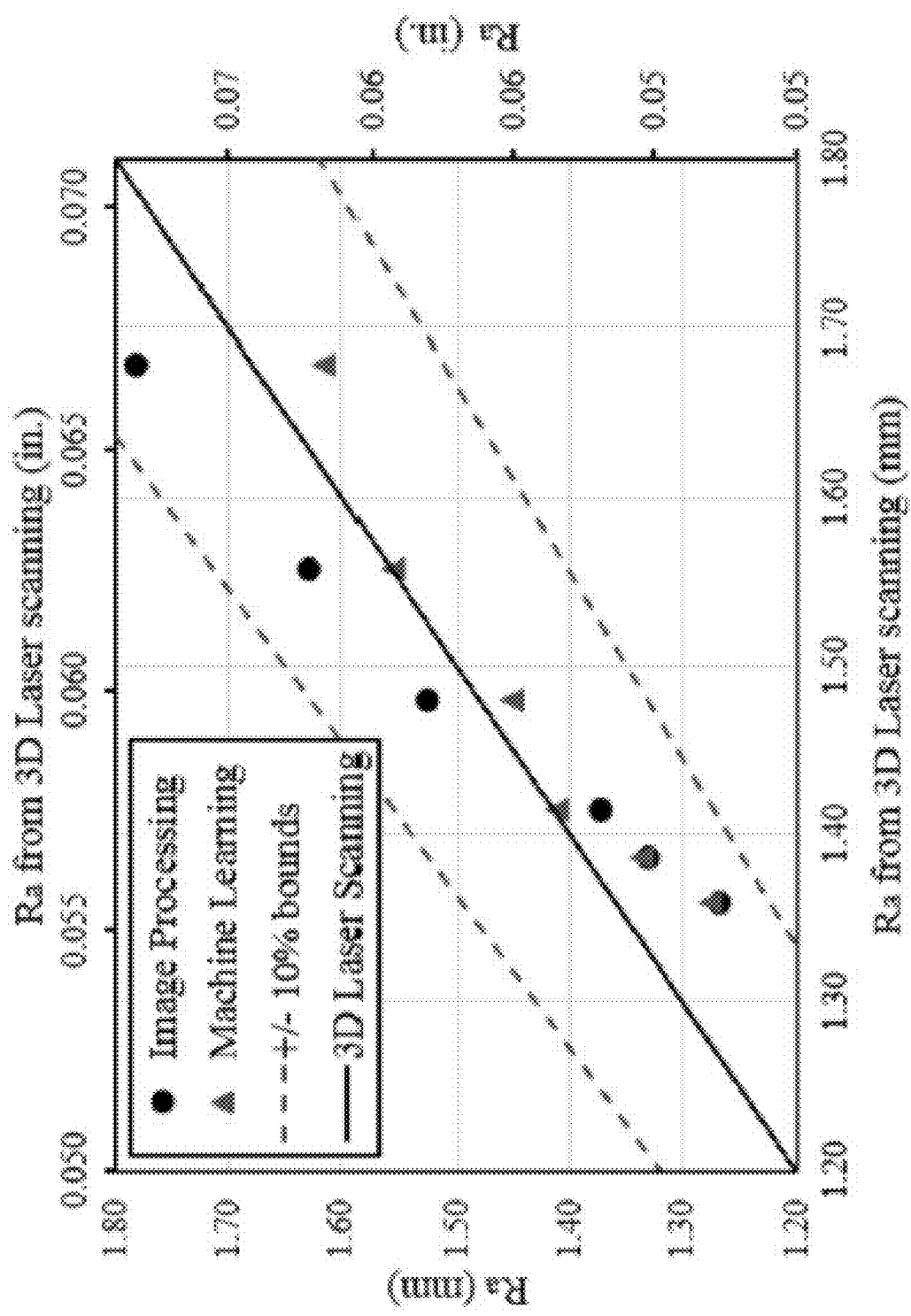
FIG. 12 is a chart showing a comparison between a 3D laser scanning method, an image processing method according to an embodiment of the subject invention, and a machine learning method according to an embodiment of the subject invention.

FIG. 12 is a chart showing a comparison between a 3D laser scanning method (solid line), an image processing method according to an embodiment of the subject invention (filled circles), and a machine learning method (filled triangles) according to an embodiment of the subject invention. The dashed lines represent +/−10% variance from the 3D laser scanning method. The horizontal axes represent Ra from the 3D laser scanning method in inches and millimeters, respectively. The vertical axes represent Ra calculated according to the subject invention in inches and millimeters, respectively.

FIG. 13 shows a value of concrete surface roughness index AR for each of three different concrete surfaces measured according to an embodiment of the subject invention. Smooth concrete with no aggregate as shown in the left most image produces an AR of zero. Sandblasted concrete with some aggregate exposed produces an AR of 0.3232. Sandblasted concrete with more aggregate exposed produces an AR of 0.4509. In FIG. 13, the middle image matches FIG. 6D (rotated 90 degrees), and the right-hand image matches FIG. 6A (rotated 90 degrees).

Figure 14:
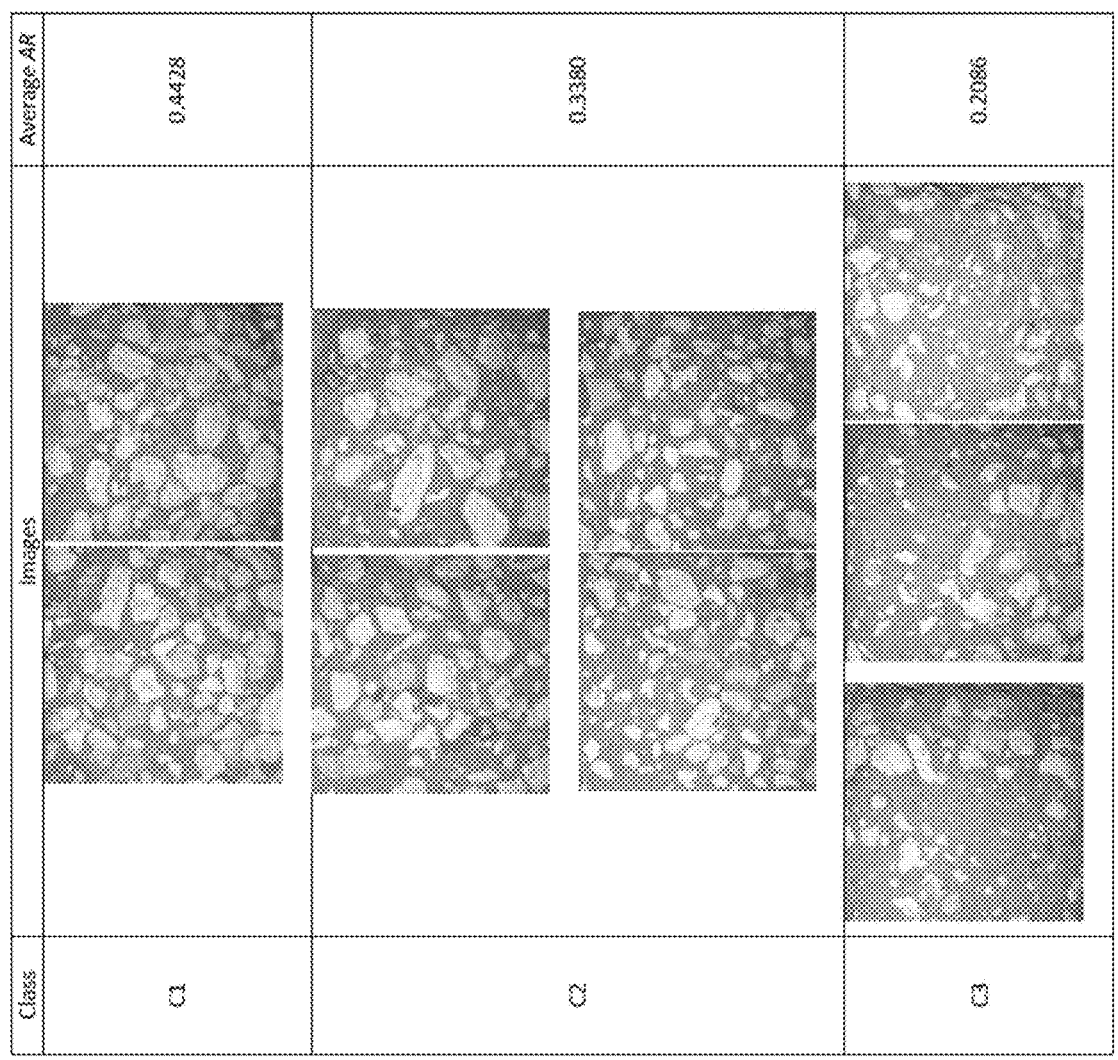
FIG. 14 shows digital image processing results, AR, used to classify and label images from FIGS. 6A through 6I into three categories for the machine learning training phase according to an embodiment of the subject invention.

FIG. 14 shows digital image processing results, AR, used to classify and label images from FIGS. 6A through 6I into three categories for the machine learning training phase according to an embodiment of the subject invention. The images from FIGS. 6A and 6B were grouped into class C1, with the highest roughness and had an average AR of 0.4428. The images from FIGS. 6C, 6D, 6E, and 6F were grouped into class C2, with the medium roughness and had an average AR of 0.3380. The images from FIGS. 6G, 6H, and 6I were grouped into class C3, with the lowest roughness and had an average AR of 0.2086.

Figure 15:
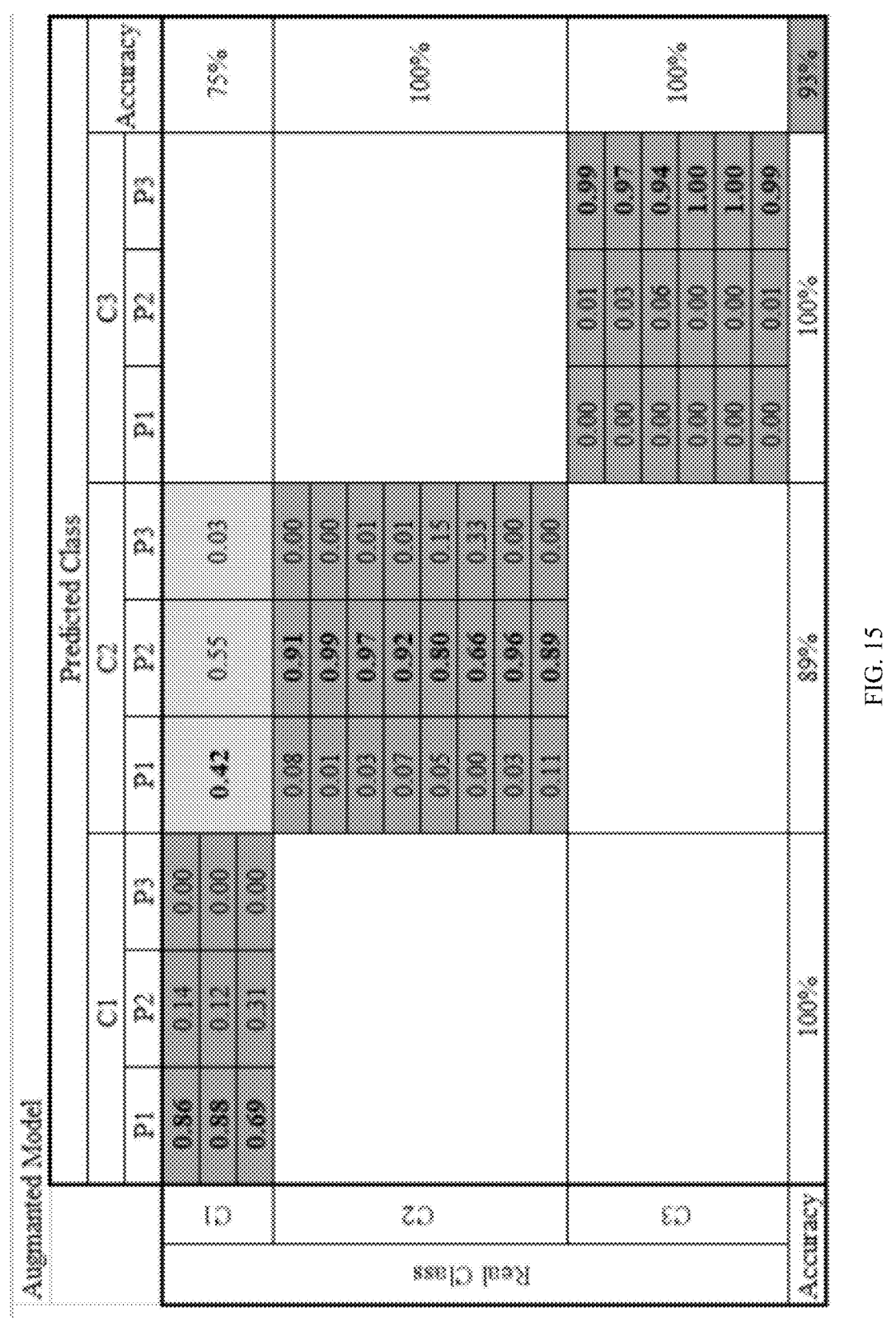

FIG. 15 shows a detailed confusion matrix for a deep learning model with transfer learning and data augmentation ("aug." model) according to an embodiment of the subject invention. Additional data is provided for one sample from "Real Class" C1 (i.e., as determined by 3D laser scanner method) and "Predicted Class" C2 (i.e., as determined by digital image processing and augmented machine learning methods according to an embodiment of the subject invention.) This image was classified in C2 by the aug. deep learning model with a P1 probability value of 0.42 (i.e., 42% chance of being in Class C1), a P2 probability value of 0.55 (i.e., 55% chance of being in Class C2), a P3 probability value of 0.03 (i.e., 3% chance of being in Class C3).

Figure 16:
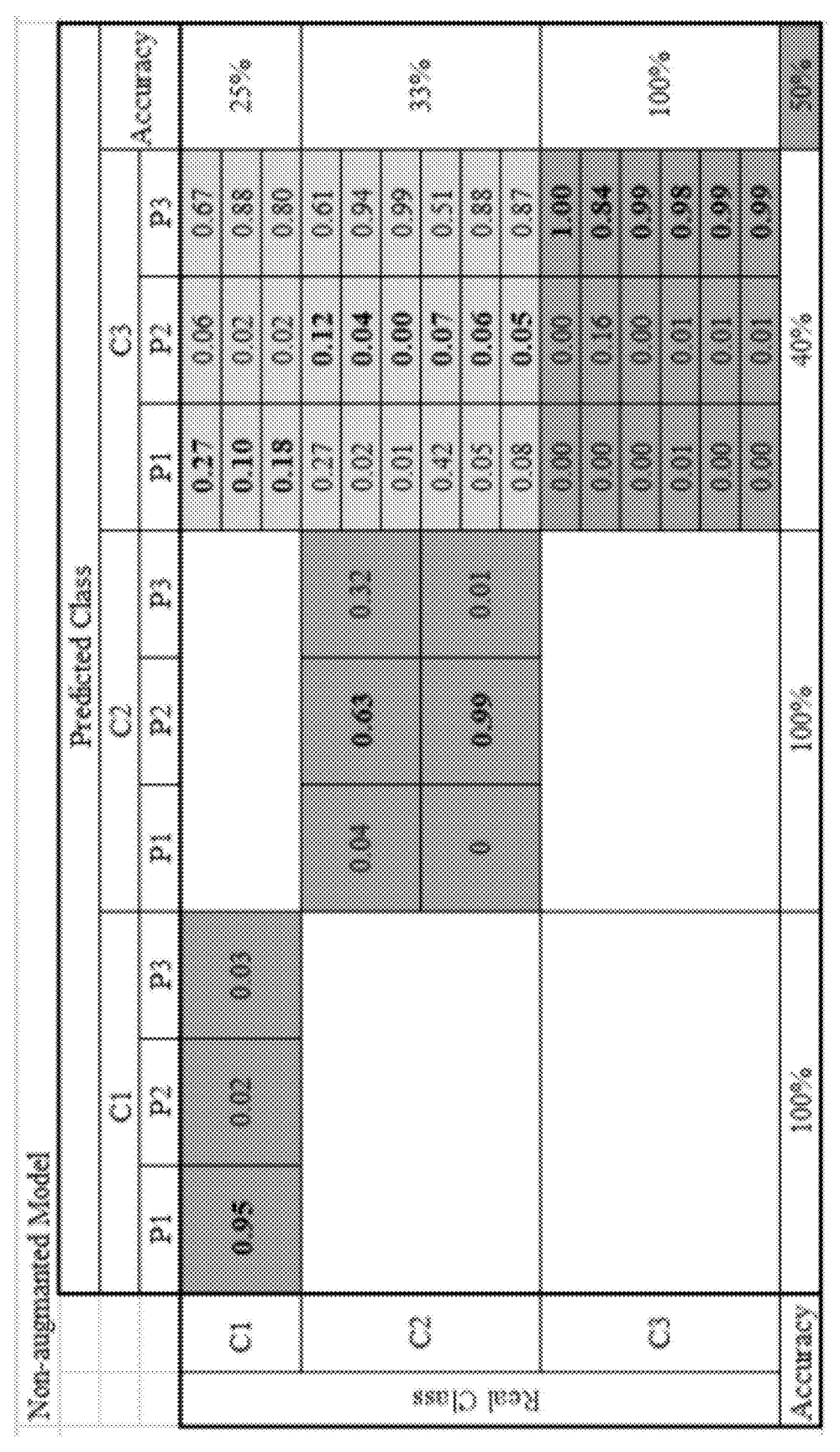

FIG. 16 shows a detailed confusion matrix for deep learning model with transfer learning and without augmentation ("non-aug." model) according to an embodiment of the subject invention. Additional data is provided for three samples from "Real Class" C1 (i.e., as determined by 3D laser scanner method) and "Predicted Class" C3 (i.e., as determined by digital image processing and non-augmented machine learning methods according to an embodiment of the subject invention.) For example, the first image at the top of the C3 column was classified in C3 by the non-aug. deep learning model with a P1 probability value of 0.27 (i.e., 27% chance of being in Class C1), a P2 probability value of 0.06 (i.e., 6% chance of being in Class C2), a P3 probability value of 0.67 (i.e., 67% chance of being in Class C3). Additional data is also provided for six samples from "Real Class" C2 (i.e., as determined by 3D laser scanner method) and "Predicted Class" C3 (i.e., as determined by digital image processing and non-augmented machine learning methods according to an embodiment of the subject invention.) For example, the first image at the top of the cell at the intersection of the C2 row and C3 column was classified in C3 by the non-aug. deep learning model with a P1 probability value of 0.27 (i.e., 27% chance of being in Class C1), a P2 probability value of 0.12 (i.e., 12% chance of being in Class C2), a P3 probability value of 0.61 (i.e., 61% chance of being in Class C3).

The improved results of the augmented model can be seen by comparing FIG. 15 to FIG. 16, as the augmented model agreed more closely with the 3D laser scanning results.

Embodiments of the subject invention address the technical problem of estimating the degree of concrete surface roughness being expensive, needing excessive human processing, not being suitable for assessing old structures based on their inspection records, and requiring contact methods. This problem is addressed by providing digital image processing with a new index for concrete surface roughness based on the aggregate area-to-total surface area (AR), in which a machine learning method applying a combination of advanced techniques is utilized to categorize images based on the classification given during the learning process.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1: Digital Image Analysis

A 3D laser scanner method for estimating concrete surface roughness (Santos, et al., 2010) was used to measure the concrete surface roughness of nine small specimens. Several images were taken for each of the nine samples in a dark room with flash applied using a commercial camera of a smartphone with a quality of 12 megapixels.

After obtaining high quality images for the concrete surfaces, the resolution was enhanced to 600×600 pixels from an original resolution of 300×300 pixels for the small surfaces with an area size of 153 mm×153 mm (6 in.×6 in.), as shown in FIG. 2A.

The images were analyzed in MATLAB software in five stages:

1) A contrast enhancement filter was applied to all images to better distinguish boundary intensity between aggregate and cement, as shown in FIG. 2B.

2) To increase the accuracy of the analysis, each image was divided into 16 equal size segments, as shown in FIG. 2C.

3) The true color (RGB) image was transferred into a grayscale image, as shown in FIG. 2D, with pixel values k(n) ranging from 0 to 255. For each segment within the image, pixels representing aggregates were chosen manually and the pixel values k(n) were averaged to determine the threshold value (T), as shown in FIG. 2E. After applying the threshold, the accuracy of the method is checked qualitatively in an iterative manner.

4) The grayscale image was transferred to the black and white image, as shown in FIG. 2F, with a binary decision for pixel intensity of 0 for cement paste (black) and 1 for the aggregates (white) using Equation (2) forming a binary image g(n) per segment.

5) The number of white pixels, n(segment), representing the aggregate (Equation 3) and the total number of white and black pixels, N(segment), representing both aggregates and cement (Equation 4), were calculated for each image segment. With a resolution of 150×150 pixels, where H is vertical coordinate in the segment (H=150 pixels in this example); W is horizontal coordinate in the segment (W=150 pixels in this example); K(0) is a black pixel (digit 0) and K(1) is a white pixel (digit 1). The total aggregate area, $A_{aggregate}$, was then calculated for the whole image from each segment (Equation 5) by multiplying the number of white pixels times the area of each pixel. The total surface area, $A_{surface}$, was then calculated for the whole image from each segment (Equation 6) by multiplying the number of black pixels and white pixels times the area of each pixel. Where $A_{pixel}$=(0.254 mm)2=(0.01 in)2 and segment=16, in this example. The ratio between the total aggregate area and surface area, AR, was used as an index of concrete surface roughness (Equation 7).

The resulting AR then can be related to the surface roughness calculated from the 3D laser scanning method with a function based on the sample results.

Example 2A: Machine Learning Introduction

Machine learning and deep learning techniques may be employed according to embodiments of the subject invention to eliminate human errors, provide an automated and practical tool for estimating concrete surface roughness, and assess old structures based on images from prior inspection records. The drawbacks of digital image processing are time consumption, extensive human intervention, and the sensitivity to environmental conditions, such as type of camera used for imaging, object distance, and angle from the camera. FIGS. 3A through 3D show images obtained for the same surface with different conditions of imaging.

The provided machine learning method may be defined as a classification technique that predicts the class of each image based on its deep visual features. Classification is a supervised machine learning method that needs data with preassigned labels. The model can learn from the existing data samples to predict future labels. In this study, labels are defined as levels of surface roughness, which may be obtained from 3D laser scanning for comparison. Images may be divided into training and testing sets. The training set includes the data that are used for training the machine learning model, while the testing set includes the data for validating the model. In an embodiment, 78-88% of images are used for training and 22-12% of them are utilized for testing. Alternatively, 70, 75, 80, 85, 90, or 95% of available images may be used for training, including increments, combinations, and ranges of any of the foregoing. In certain commercial embodiments, some fraction or all available images including customer images, research images, public database images, existing images, or specially collected images may be used to train the network before using the system In order to automatically generate a variety of images to simulate additional images with real conditions, such as different lights, image source, image size, rotation, and so on, various data augmentation techniques may be applied, including random left and right rotation (e.g., rotation of 25-degrees, alternatively 5, 10, 15, 20, 30, 35, 40, or 45-degrees, including increments, combinations, and ranges of any of the foregoing), change in brightness, blur with a uniform filter (e.g., of size 11), horizontal, angled, and vertical flipping, and cropping (or even resizing) the images. Data augmentation is applied in an offline manner to increase the sample sizes of training data. These operations are applied only on the training data and increase the sample size. The lighting parameter can be, for example, any number from 0 to 1 (e.g., a value of 0.2 can reduce or increase the brightness by 20%). Image size can be fixed, and a factor (e.g., 0.2) can be used for zoon in and/or zoom out. A blur size of, for example, 11 can be used, though embodiments are not limited thereto. The blur size can be other values (e.g., 7), and these number can be adjusted and don't need to be fixed.

In this example nine small specimens were categorized into three classes, as described herein, based on the surface roughness degree from 3D laser scanning. Images of these nine specimens were augmented to increase the number of samples available for training. Exemplary samples of the augmentation results are shown in FIGS. 4A through 4D. In total, each class contains 50 training images, including both real and artificially generated images (total of 150 images across 3 classes; 63 real images and 87 artificially generated images).

In certain embodiments (e.g., as in Example 2), a pretrained model such as ResNet50 (He, et al., (2016), *Deep residual learning for image recognition*, Proceedings of the IEEE Conference on Computer Vision and Pattern Recognition (pp. 770-778); which is hereby incorporated herein by reference in its entirety) may be leveraged to extract the deep visual features from the data automatically. Other models may be used with embodiments and are contemplated within the scope of the subject invention. ResNet50 is a 50-layer CNN with residual connections, which avoids vanishing gradients and enhances the model accuracy. A sample of the residual diagram is shown in FIG. 5, where (X) is the input of each layer, and F(X) is the output. The original input is added to the output of the convolution block to produce F(X)+X. This connection is called skip (residual). Skip connections allow layers to skip layers and connect to layers further up the network, allowing for information to flow more easily up the network. The family of models can be, for example, a convolutional neural network (CNN), and ResNet50 is a common method of CNN that can be used for feature extraction.

Example 2B: Machine Learning Analysis

A set of nine small specimens were categorized into three classes based on the surface roughness degree measured by 3D laser scanning of each specimen. As represented in FIG. 14, the samples are separated into three classes (C1, C2, and C3) representing the roughest surface to the smoothest. In this technique, when a brand new image is given to the network, the output of the network generates three probabilities (e.g., [P1, P2, P3]) which represents the probability of matching with classes from C1, C2, or C3, respectively).

Advantages of this method include finding the predicted class by getting the maximum probability and estimating the roughness of the surface by getting a weighted average of the roughness of each class. More specifically, the roughness may be calculated using Equation 8A.

Embodiments provide many advantages, among them are the following.

1. Inexpensive method compared to other methods such as the 3D laser scanner.
2. Accuracy up to 93% of results obtained from 3D laser scanner.
3. Possible deployment in mobile (e.g., smart phone or tablet app) with machine learning
4. Reducing or eliminating human intervention using deployed app (e.g., in smart phones, tablet, mobile, edge computing, or cloud-based device)
5. Assisting engineers in evaluating concrete surface roughness for retrofitting and repair of concrete structures.
6. Computationally inexpensive by utilizing digital image processing for developing index and labelling and machine learning for classification Images were augmented to increase the number of samples available for training. Examples of the augmentation results are shown in FIGS. 4A through 4D. In total, each class contains 50 training images, including both real and artificially generated images (total of 150 images across 3 classes; 63 real images and 87 artificially generated images).

A pretrained model, ResNet50 in this example, was leveraged to extract the deep visual features from the data automatically. ResNet50 is a 50-layer CNN with residual connections, which avoids vanishing gradients and enhances the model accuracy. A sample of the residual diagram is shown in FIG. 5, where (X) is the input of each layer, and F(X) is the output. The original input is added to the output of the convolution block to produce F(X)+X. This connection is called skiper (residual).

In this example the model is pretrained on the ImageNet dataset (a very large scale image dataset with millions of samples and 1,000 classes). The last layer of this model is removed, and a new classification layer (also called softmax) with three outputs is added to this network to predict the corresponding classes. The weight of this layer is initialized randomly to be learned by the new dataset, while all other layers' weights are frozen, which means that the layer weights are not updated during the training. In other words, the filters in the first convolutional layers in ResNet have already learned to recognize edges, colors, angles, circles, and so on and can be directly used to extract general features from images without needing a large scale dataset.) ImageNet is the largest dataset used for all these computer vision classification tasks and all these models are only pretrained on ImageNet, if the task was object detection or segmentation there was other datasets such as COCO or PASCAL. ImageNet is only provided as one example and should not be construed as limiting. The softmax function, also known as softargmax or normalized exponential function, is a generalization of the logistic function to multiple dimensions. It is used in multinomial logistic regression and is often used as the last activation function of a neural network to normalize the output of a network to a probability distribution over predicted output classes, based on Luce's choice axiom. The softmax function takes as input a vector z of K real numbers, and normalizes it into a probability distribution consisting of K probabilities proportional to the exponentials of the input numbers.

Based on the result of 3D laser scanning, the samples are separated into three classes (C1, C2, and C3) representing the roughest surface to the smoothest. In this technique, when a brand new image is given to the network, the output of the network generates three probabilities (e.g., [P1, P2, P3]), which represents the probability of matching with classes C1, C2, C3, respectively. This method has at least two notable benefits; first, it is possible to find the predicted class by getting the maximum obvious probability and second, it can estimate the roughness of the surface (e.g., by getting a weighted average of the roughness of each class multiplied by the respective probability of matching that class.) The roughness may be estimated from the model using Equation (8A):

$$R_a = P_1 \cdot (C1_{av}) + P_2 \cdot (C2_{av}) + P_3 \cdot (C3_{av}) \quad\quad 8A$$

where C1av, C2av, and C3av are the average roughness of classes C1 to C3, respectively; and P1, P2, and P3 are the probabilities of matching to each of classes C1 to C3, respectively, as defined above.

Alternatively, the concrete surface roughness index (AR) may be estimated from the model using Eq. 8B.

$$AR = P_1(AR1_a) + P_2(AR2_{av}) + P_3(AR3_{av}) \quad\quad 8B$$

where AR1av, AR2av, and AR3av are the average concrete surface roughness index of classes C1 to C3 respectively.

The input image size is set to 300×300 pixels. In this example, the Adam optimization method (Kingma, et al., (2014), *Adam: A method for stochastic optimization*, arXiv preprint arXiv:1412.6980; which is hereby incorporated herein by reference in its entirety) with learning rate 0.0001 was used to update the weights of the network iteratively. Due to the small size of the dataset, in this example the batch size was selected as eight (e.g., eight images are passed through the network in each iteration to update the network parameters), and the epoch was set to 100. In other words, in each epoch, the entire training dataset is passed through the network. The loss function was selected as "categorical cross-entropy," which is a common loss function for multiclass classification.

Example 3: Correlation of Image Processing and Machine Learning to 3D Laser Scanning The degree of surface roughness of the nine small specimens used in the previous examples was calculated based on Equation (1), as listed in Table 1, using the 3D laser scanning method. The average roughness, standard deviation, and coefficient of variance were calculated as 1.5867 mm (0.0625 in.), 0.3563 mm (0.0140 in.), and 8%, respectively. The nine samples are categorized into three classes C1 (Ra>1.85 mm), C2 (1.85 mm≥Ra≥1.35 mm), and C3 (Ra<1.35 mm), representing the roughest surface to the smoothest. The average surface roughness of each class is listed in Table 1.

TABLE 1

Calculated Ra for each small sample (S).

| S | Class | $R_a$ (mm) | $R_a$ (in.) | Avg. ($C_{av}$) |
|---|---|---|---|---|
| 1 | C1 | 2.1999 | 0.0866 | 2.1499 mm |
| 2 |    | 2.0998 | 0.0827 | 0.0846 in. |
| 3 | C2 | 1.6998 | 0.0669 |  |
| 4 |    | 1.5999 | 0.0630 | 1.5499 mm |
| 5 |    | 1.4999 | 0.0591 | 0.0610 in. |
| 6 |    | 1.3998 | 0.0551 |  |
| 7 | C3 | 1.3005 | 0.0512 | 1.268 mm |
| 8 |    | 1.2979 | 0.0511 | 0.0498 in. |
| 9 |    | 1.1989 | 0.0472 |  |

The results of the digital image processing method for the images which were taken in a dark room with flash applied (FIG. 6) are presented herein. The total area of exposed aggregate was used as a criterion to distinguish the degree of concrete surface roughness. Not surprisingly, the samples with more exposed aggregates (FIGS. 6A and 6B, samples (S) 1 and 2) get higher average surface roughness if compared to samples with less exposed aggregates (FIGS. 6G, 6H, and 6I for samples (S) 7, 8, and 9, respectively), as shown in Table 2, which shows the productivity of this method. The maximum, minimum, and average of the threshold used for each image and the total area of aggregate for each image are listed in Table 2.

TABLE 2

Digital image processing results for small samples (S).

| S | T (min) | T (max) | T (avg.) | Aggregate area mm$^2$(in$^2$) | (AR) |
|---|---|---|---|---|---|
| 1 | 110 | 160 | 137 | 10472 (16.23) | 0.4509 |
| 2 | 85  | 170 | 144 | 9970 (15.45)  | 0.4293 |
| 3 | 125 | 200 | 151 | 8946 (13.87)  | 0.3852 |
| 4 | 140 | 205 | 169 | 7506 (11.63)  | 0.3232 |
| 5 | 145 | 200 | 167 | 7449 (11.55)  | 0.3207 |
| 6 | 160 | 180 | 161 | 7431 (11.52)  | 0.3199 |
| 7 | 160 | 220 | 187 | 4890 (7.58)   | 0.2105 |

TABLE 2-continued

Digital image processing results for small samples (S).

| S | T (min) | T (max) | T (avg.) | Aggregate area mm$^2$(in$^2$) | (AR) |
|---|---|---|---|---|---|
| 8 | 130 | 220 | 190 | 4888 (7.58) | 0.2105 |
| 9 | 150 | 230 | 196 | 4874 (7.56) | 0.2099 |

T = threshold.

Considering the test results graphically shown in FIG. 7, the correlation between the surface roughness obtained from the 3D laser scanning method ($R_a$) and the ratio of the aggregate area-to-total area (AR) can be expressed by regression using a polynomial function (Equation 9) for AR values ranging from 0.2 to 0.45. The corresponding constant coefficients of the suggested equation are listed in Table 3.

$$R_a = k_1 AR^2 + k_2 AR + k_3 \qquad (9)$$

where Ra is concrete surface roughness (from 3D laser scanning method for calibration); AR is the ratio of aggregate area-to-total surface area; k1, k2, and k3 are coefficients to correlate the ratio of AR ((aggregate area) to (total area)) to $R_a$ (concrete surface roughness.)

TABLE 3

Coefficients values for $k_1$, $k_2$ and $k_3$.

| Unit System | $k_1$ | $k_2$ | $k_3$ | $R^2$ |
|---|---|---|---|---|
| (mm) | 15.106 | −6.0754 | 1.8778 | 0.9668 |
| (in.) | 0.5947 | −0.2393 | 0.0739 |  |

Results discussed herein are related to images which were taken in a dark room with flash applied. For any other environmental or imaging conditions, a new correlation between AR and concrete surface roughness Ra may be established as the method may be sensitive to environmental or imaging conditions.

The ResNet50 deep learning model was trained on the training dataset for two models. The first model, with augmentation (aug.), was trained with a total number of 150 images (63 real images and 87 artificially generated, or augmented, images) and the second model, without augmentation (non-aug.), was trained using a total number of 63 real images, and then the performance of the network was evaluated on the testing data. The testing samples are not augmented, and they are not used during the training step. Therefore, the model has never seen the testing data previously. The testing images (two per each surface; 18 in total) are carefully selected to be different from the training samples (e.g., they are taken in a different lighting condition, or with a different angle).

FIG. 8 shows the accuracy performance of these two models (aug. and non-aug.) on the validation (testing) dataset during training. In other words, after each epoch, the model is evaluated on the testing set.

The performance of "non-aug." model did not improve as much as the "aug" model over the time and the dotted plot for "non-aug." is relatively flat (it only improves from 25% to 38%), while the "aug." model did improve its accuracy much more over the time and reaches to 94% in the final epochs. Similarly, in FIG. 9, it can be noted that the loss value of the "aug." model reduces over time; however, the "non-aug." does not learn as much from the dataset. Both FIG. 8 and FIG. 9, respectively, show the trends of accuracy and loss for these two models to show how each model performed after each iteration of optimization.

These results demonstrate the importance of augmentation or synthetic data in training deep neural networks on such small datasets. The confusion matrices of these two models ("aug." and "non-aug.") are also shown in Tables 4 and 5, respectively. Detailed presentations of Tables 4 and 5 are shown in Tables 8 and 9, respectively. From Table 5, it can be observed that the model without augmentation is strongly over-fitted to the class C3 and cannot detect other classes well.

From Table 4, it can be observed that the model with augmentation (the "aug." model) can classify all images in the current data set correctly except one of the samples in class 1. On the other hand, "non-aug." model misclassified many samples from class 1 and class 2 to class 3 instead.

TABLE 4

Confusion matrix for deep learning model with transfer learning and data augmentation.

| aug. | | Predicted class | | |
|---|---|---|---|---|
| | | C1 | C2 | C3 |
| Real class | C1 | 3 | 1 | 0 |
| | C2 | 0 | 8 | 0 |
| | C3 | 0 | 0 | 6 |

TABLE 5

Confusion matrix for deep learning model with transfer learning and without augmentation.

| non-aug. | | Predicted class | | |
|---|---|---|---|---|
| | | C1 | C2 | C3 |
| Real class | C1 | 1 | 0 | 3 |
| | C2 | 0 | 2 | 6 |
| | C3 | 0 | 0 | 6 |

Example 4: Method Validation Using Large Scale Specimen

To validate both digital image processing and machine learning methods, a new set of images was extracted from a large scale T-beam, which was roughened using sandblasting, as illustrated (not to scale) in FIG. 10. The purpose of this step is to run new images that both methods never experienced before and to predict the degree of surface roughness and then compare the results to those obtained from the 3D laser scanning method.

Six images were used in the validation of both digital image processing and machine learning methods, which belong to a web of a large T-beam with a total length (L) of 4,724 mm (186 in.) and a height (H) of 419 mm (16.5 in.) A shown in FIG. 10. Each sample (X by Y) was 203.2 mm×203.2 mm (8 in.×8 in.), as shown in FIG. 10 and in FIGS. 11A through 11F.

Table 6 shows the values for average surface roughness obtained from the 3D laser scanning method (Equation 1), the ratio of the aggregate area-to-total area AR (Equation 7), and average surface roughness (Ra) obtained from digital image processing method using Equation (9). The maximum error of the digital image processing method never exceeded 7%.

TABLE 6

Comparison between 3D laser scanning and image processing results.

| Sample | $R_a$ scanning (mm) | AR Eq. 7 | $R_a$ (mm) Eq. 9 | Error |
|---|---|---|---|---|
| 1 | 1.4141 | 0.285 | 1.3727 | 2.93% |
| 2 | 1.6791 | 0.386 | 1.7827 | 6.17% |
| 3 | 1.3591 | 0.195 | 1.2671 | 6.77% |
| 4 | 1.3857 | 0.266 | 1.3301 | 4.02% |
| 5 | 1.4798 | 0.332 | 1.5251 | 3.06% |
| 6 | 1.5577 | 0.356 | 1.6287 | 4.56% |

(1 mm = 0.03937 in.)

Table 7 shows the probability of each image to match each class (e.g., large scale sample 2 match 17% of class 1, 66% of class 2, and 17% of class 3), the predicted class which is the class with dominated probability (e.g., large scale sample 2 matches 66% of class 2, therefore, it was classified as C2, whereas large scale sample 3 matches 97% of class 3, therefore, it was classified as C3), and the average surface roughness obtained from machine learning using Equation (8). It can be noted that the maximum error of the machine learning method never exceeded 6.5%.

TABLE 7

Comparison between 3D laser scanning and machine learning results. (1 mm = 0.03937 in.)

| Sample | P1 | P2 | P3 | C | $R_a$ Eq. 8 (mm) | Error |
|---|---|---|---|---|---|---|
| 1 | 0.01 | 0.48 | 0.51 | C2 | 1.4110 | 0.22% |
| 2 | 0.17 | 0.66 | 0.17 | C2 | 1.6162 | 3.75% |
| 3 | 0.00 | 0.03 | 0.97 | C3 | 1.2743 | 6.24% |
| 4 | 0.01 | 0.17 | 0.82 | C3 | 1.3356 | 3.62% |
| 5 | 0.01 | 0.62 | 0.37 | C2 | 1.4507 | 1.97% |
| 6 | 0.04 | 0.90 | 0.06 | C2 | 1.5568 | 0.06% |

FIG. 12 shows a comparison between the values of average surface roughness for both image processing and machine learning methods against those obtained from 3D laser scanning with errors never exceeded 7% for both methods.

FIG. 15 and FIG. 16 show the detailed data supporting Table 4 and Table 5, respectively.

These examples demonstrate:

1. The digital image processing method can be used as an efficient tool for measuring surface roughness if the environmental conditions of the images are accounted for.

2. The ratio of the aggregate area-to-the total area of the surface (AR) can be used as an index to classify surface roughness and can be directly correlated to the average surface roughness obtained from the 3D laser scanning method with an accuracy of at least 93%.

3. The machine learning technique may provide advantages including reduced sensitivity to environmental conditions, and decreased need for human intervention.

4. The transfer learning technique could be successfully used to transfer the knowledge learned from a large scale dataset, such as ImageNet, to the proposed domain with a small number of images.

5. By applying data augmentation techniques, the proposed deep learning model could increase the accuracy by 56% if compared to the model without augmentation (94% vs. 38%) and could overcome issues such as the limited number of source data for deep learning training.

6. The pretrained ResNet50 augmented model could successfully classify the surface roughness and could predict the surface roughness with an accuracy of more than 93% for new images that were not experienced during the training of the machine learning model.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for obtaining a measurement of surface roughness of a concrete sample, the method comprising:
   receiving, by a processor, a first training image set;
   augmenting, by the processor, the first training image set, to create an augmented training image set comprising training images;
   determining, by the processor, a surface roughness measurement for each training image;
   classifying, by the processor, each training image into a training classification group based on the surface roughness measurement determined for that respective training image;
   determining, by the processor, an average surface roughness measurement for each training classification group;
   training, by the processor, a convolutional neural network to classify new images into a roughness classification group, to produce a trained convolutional neural network (TCNN);
   receiving, by the processor, a new image of the concrete sample, the new image not being present in the augmented training image set; and
   determining, by the processor, using the TCNN, a value of average surface roughness ($R_a$) for the new image of the concrete sample, to obtain the measurement of surface roughness of the concrete sample.

2. The method according to claim 1, the augmenting of the first training image set comprising one or more of random left and right rotation of images, change in brightness, blur, horizontal and vertical flipping, and resizing of images.

3. The method according to claim 2, the determining of a surface roughness measurement for each training image comprising at least one of loading values from existing measurements or calculating one or more values from digital image processing of training images.

4. The method according to claim 3, the existing measurements comprising non-contact measurements associated with respective training images.

5. The method according to claim 4, the non-contact measurements comprising 3D laser scanning.

6. The method according to claim 4, the non-contact measurements comprising digital image analysis.

7. The method according to claim 3, the digital image processing of training images comprising calculation of a ratio of aggregate area-to-total surface area (AR).

8. The method according to claim 7, the training of the convolutional neural network comprising transfer learning from a dataset larger than the augmented training image set and training on training images from the augmented training image set.

9. The method according to claim 1, the determining of the $R_a$ for the new image of the concrete sample being completed on a computing device at a same physical location as the concrete sample.

10. The method according to claim 9, the new image of the concrete sample being obtained from a camera in operable communication with the computing device at the same physical location as the concrete sample.

11. The method according to claim 1, the augmenting of the first training image set being performed in an offline manner.

12. The method according to claim 1, the determining of the $R_a$ for the new image of the concrete sample comprising:
    defining a positive integer n and a positive integer index i ranging from 1 to n;
    defining a set of n roughness classes (Ci);
    defining for each Ci an associated average roughness value ($Ci_{av}$);
    generating for each Ci, a probability ($P_i$) of matching the new image with that respective Ci, the generating of the $P_i$ comprising using the TCNN; and
    determining the $R_a$ for the new image from the sum of each $P_i$ multiplied by the respective $Ci_{av}$.

13. The method according to claim 12, the determining of the $R_a$ for the image comprising using the following equation:

$$R_a = \sum_{i=1}^{n} ((P_i) \cdot (Ci_{av})).$$

14. The method according to claim 12, the augmenting of the first training image set being performed in an offline manner.

15. The method according to claim 12, the augmenting of the first training image set comprising one or more of random left and right rotation of images, change in brightness, blur, horizontal and vertical flipping, and resizing of images.

16. The method according to claim 12, the determining of a surface roughness measurement for each training image comprising at least one of loading values from existing measurements or calculating one or more values from digital image processing of training images.

17. The method according to claim 16, the existing measurements comprising non-contact measurements associated with respective training images.

18. The method according to claim 17, the non-contact measurements comprising at least one of 3D laser scanning and digital image analysis.

19. The method according to claim 16, the digital image processing of training images comprising calculation of a ratio of aggregate area-to-total surface area (AR).

20. A method for obtaining a measurement of surface roughness of a concrete sample, the method comprising:
    receiving, by a processor, a first training image set;
    augmenting, by the processor, the first training image set, to create an augmented training image set comprising training images;
    determining, by the processor, a surface roughness measurement for each training image;

classifying, by the processor, each training image into a training classification group based on the surface roughness measurement determined for that respective training image;

determining, by the processor, an average surface roughness measurement for each training classification group;

training, by the processor, a convolutional neural network to classify new images into a roughness classification group, to produce a trained convolutional neural network (TCNN);

receiving, by the processor, a new image of the concrete sample, the new image not being present in the augmented training image set; and determining, by the processor, using the TCNN, a value of average surface roughness ($R_a$) for the new image of the concrete sample, to obtain the measurement of surface roughness of the concrete sample, the augmenting of the first training image set comprising one or more of random left and right rotation of images, change in brightness, blur, horizontal and vertical flipping, and resizing of images, the determining of a surface roughness measurement for each training image comprising at least one of loading values from existing measurements or calculating one or more values from digital image processing of training images, the existing measurements comprising non-contact measurements associated with respective training images, the non-contact measurements comprising at least one of 3D laser scanning and digital image analysis, the digital image processing of training images comprising calculation of a ratio of aggregate area-to-total surface area (AR), the training of the convolutional neural network comprising transfer learning from a dataset larger than the augmented training image set and training on training images from the augmented training image set, the determining of the $R_a$ for the new image of the concrete sample being completed on a computing device at a same physical location as the concrete sample, the new image of the concrete sample being obtained from a camera in operable communication with the computing device at the same physical location as the concrete sample, the augmenting of the first training image set being performed in an offline manner, the determining of the $R_a$ for the new image of the concrete sample comprising:

defining a positive integer n and a positive integer index i ranging from 1 to n;

defining a set of n roughness classes (Ci);

defining for each Ci an associated average roughness value ($Ci_{av}$);

generating for each Ci, a probability ($P_i$) of matching the new image with that respective Ci, the generating of the $P_i$ comprising using the TCNN; and determining the $R_a$ for the new image from the sum of each $P_i$ multiplied by the respective $Ci_{av}$, and the determining of the $R_a$ for the image comprising using the following equation:

$$R_a = \sum_{i=1}^{n} ((P_i) \cdot (Ci_{av})).$$

* * * * *